US006585815B2

United States Patent
Koitabashi et al.

(10) Patent No.: US 6,585,815 B2
(45) Date of Patent: Jul. 1, 2003

(54) INK SET, INK-JET PRINTING METHOD USING SUCH INK SET, RECORDING UNIT, INK CARTRIDGE AND INK-JET PRINTING APPARATUS

(75) Inventors: Noribumi Koitabashi, Kanagawa (JP); Hitoshi Tsuboi, Tokyo (JP); Yasunori Fujimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 09/884,111

(22) Filed: Jun. 20, 2001

(65) Prior Publication Data
US 2002/0043177 A1 Apr. 18, 2002

(30) Foreign Application Priority Data
Jun. 21, 2000 (JP) .......................................... 2000-187019

(51) Int. Cl.$^7$ ................................................ C09D 11/02
(52) U.S. Cl. ................................ 106/31.27; 106/31.28; 106/31.6; 347/100
(58) Field of Search ........................... 106/31.27, 31.28, 106/31.6; 347/100

(56) References Cited

U.S. PATENT DOCUMENTS

| 6,039,793 | A | * | 3/2000 | Gundlach et al. | ........ | 106/31.28 |
| 6,062,674 | A | | 5/2000 | Inui et al. | ........ | 347/43 |
| 6,440,203 | B2 | * | 8/2002 | Kato | ........ | 103/31.6 |
| 6,460,987 | B1 | * | 10/2002 | Katsuragi et al. | ........ | 347/100 |
| 6,503,307 | B1 | * | 1/2003 | Noguchi | ........ | 106/31.27 |
| 2002/0041317 | A1 | * | 4/2002 | Kashiwazaki et al. | ........ | 347/100 |
| 2002/0093557 | A1 | * | 7/2002 | Takuhara et al. | ........ | 347/100 |

FOREIGN PATENT DOCUMENTS

| EP | 0 831 135 A1 | 3/1998 |
| EP | 0 943 666 A2 | 9/1999 |
| EP | 0 962 324 A1 | 12/1999 |
| JP | 8-281930 | 10/1996 |

* cited by examiner

Primary Examiner—Helene Klemanski
(74) Attorney, Agent, or Firm—Fitzpatrick, Cella, Harper & Scinto

(57) ABSTRACT

High quality images showing an excellent fixation are formed by an ink-jet recording method using pigment inks. An ink set for the ink jet-recording method comprises a first ink containing an anionic dye in an aqueous medium, a second ink containing an anionic dye and having a lower coloring material content than the first ink and a dispersion destabilizing substance, and a third ink containing a self-dispersible first pigment, a second pigment and a polymeric dispersant for dispersing the second pigment in an aqueous medium. The dispersion destabilizing substance destabilizes the dispersion stability of at least either the first pigment or the second pigment in the third ink when the second ink and the third ink are brought into contact with each other. The second ink and the third ink are applied onto a printing medium one after another or substantially simultaneously so that they are brought into contact with each other in a liquid state on the printing medium.

46 Claims, 9 Drawing Sheets

FIG. 1
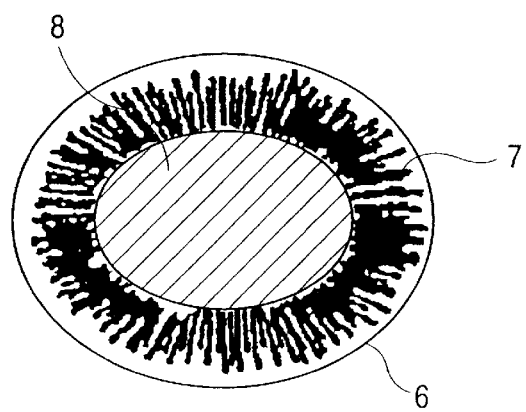
FIG. 2A    FIG. 2B    FIG. 2C
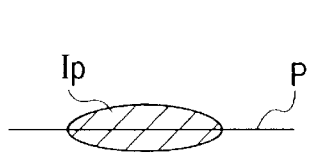 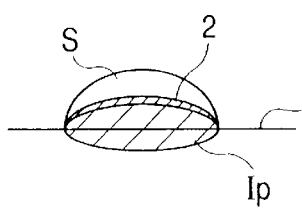 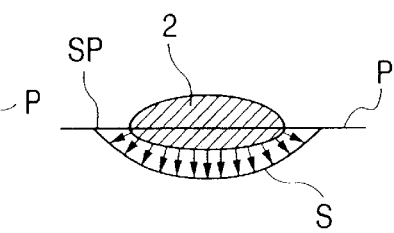

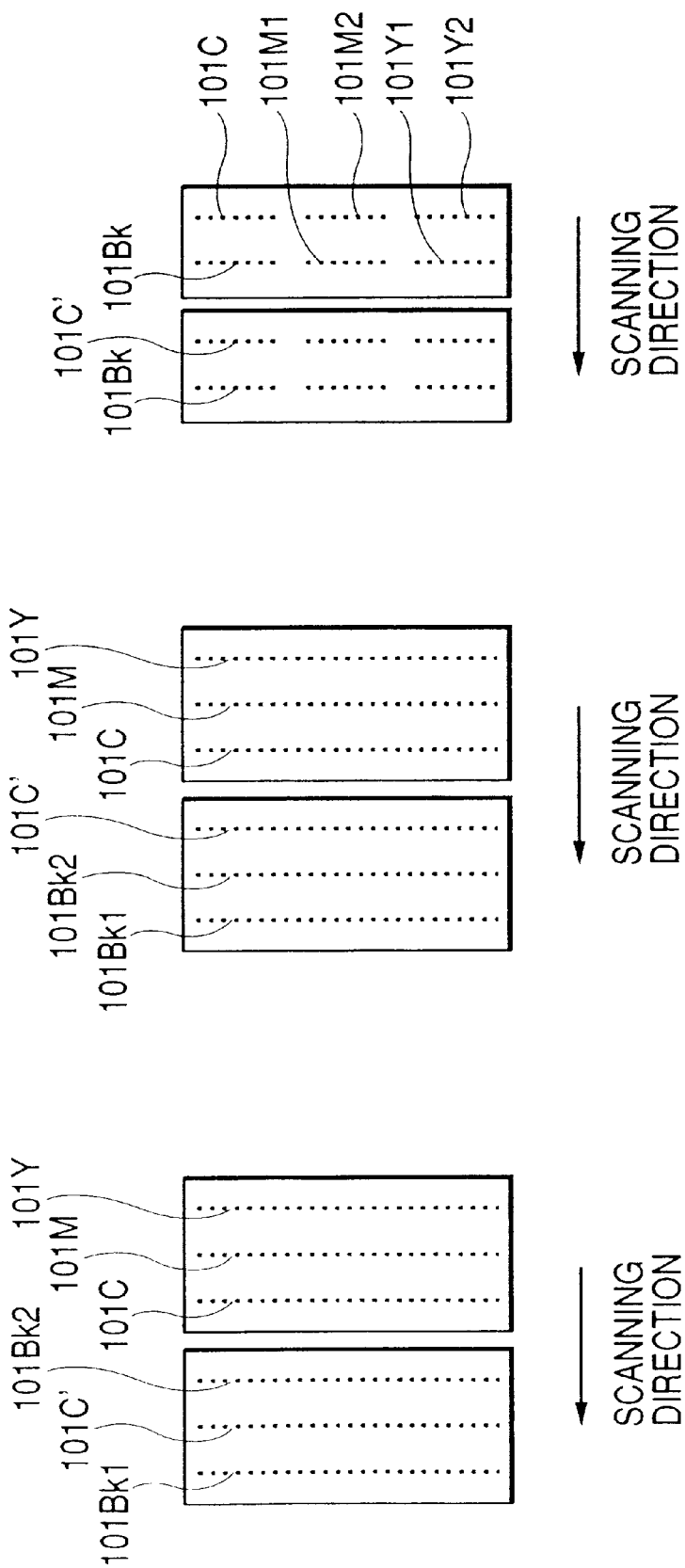

SCANNING DIRECTION

SCANNING DIRECTION

INK SET, INK-JET PRINTING METHOD USING SUCH INK SET, RECORDING UNIT, INK CARTRIDGE AND INK-JET PRINTING APPARATUS

BACKGROUND OF THE INVENTION

1. Field of the Invention

This invention relates to an ink set, an ink-jet printing method, a recording unit, an ink cartridge and an ink-jet printing apparatus.

2. Related Background Art

In the course of the increasing popularity of ink-jet printers and other similar devices as we observe today, they are required to print high quality images than ever. It is well known that one of the major factors that determine the printing quality is the ink dots formed on the printing medium or the optical density (to be also referred to as OD hereinafter) of the ink dots. In the operation of printing black characters, the higher the OD value of the dots formed by means of black ink on the printing medium, the better the contrast to the base color of the printing medium and the quality of the image formed of ink dots. Similarly, the image formed of ink dots by using ink of some other color, which may be cyan, magenta or yellow, is better when the OD value of the dots is high.

The amount of the coloring material of ink that is left on the surface of the printing medium without permeating the latter is one of the various factors that affect the quality of the dots formed by ink on the printing medium. From this point of view, ink is normally ejected from the printing head at a rate as high as possible. A simple and easy way for increasing the amount of ink applied to a same area of the printing medium is to repeat the scanning operation of the printing head for a number of times so as to eject ink repeatedly onto the same area. This technique is currently very popular.

Another technique for increasing the amount of the coloring material of ink remaining on the surface of the printing medium is to apply a treatment liquid that makes the coloring material undissolvable onto the printing medium with ink in order to raise the amount of the coloring material left on the surface of the printing medium and improve the optical density of the dot image formed on the printing medium.

The applicant of the present patent application proposed a printing apparatus and a printing method realized on the basis of this technique in Japanese Patent Application Laid-Open No. 8-281930. According to the cited patent document, when printing a black image, treatment liquid is ejected onto the printing medium to make it show a predetermined pixel pattern along with the black ink that is ejected to the image area. The treatment liquid is cationic and hence shows the polarity opposite to that of the black ink that is anionic so that it makes black ink undissolvable and raises the density of the formed image. Additionally, the image density is raised further and the color tone is prevented from shifting if ink of some other color is ejected simultaneously to show the predetermined pattern.

The invention of the above cited patent document further provides the advantages that no printing head dedicated to the treatment liquid is required and the water resistance of the formed image is improved by the treatment liquid by using a printing apparatus having a simple configuration and that it can effectively prevent the phenomenon of feathering and that of bleeding from taking place.

The European patent application EP 831135 A1 discloses a similar technique. According to this patent document, pale magenta or cyan ink is ejected onto the dots of black ink with a low density to turn the black ink undissolvable by means of an ingredient of the low pale ink.

Generally, ink is selected from the viewpoint of ink ejection performance, printing characteristics including fixability and printing quality including blurring of printed images, optical reflection density and chromogenic property. Meanwhile, it is well known that there are two types of ink in terms of the coloring material contained therein. They are dye ink and pigment ink.

Pigment ink is advantageous to dye ink from the viewpoint of water-resistance and light-resistance and adapted to print characters clearly to realize high quality printing. On the other hand, pigment ink takes more time than dye ink for fixation on a printing medium and is not satisfactory in terms of abrasion resistance of the image after fixation if compared with dye ink. Additionally, each ink dot of pigment ink formed on a printing medium by a single ink ejecting operation of a nozzle is relatively small if compared with that of dye ink. The pigment contained in pigment ink can be reliably and stably dispersed in ink by means of the electric repulsion of a polymeric dispersant that outdoes the intermolecular force applied to the pigment particles of ink that are apt to aggregate. Therefore, it is preferable to add a polymeric dispersant to pigment ink at a rate that depends on the pigment content of pigment ink. Further, it is also proposed to prepare pigment ink containing a self-dispersion type pigment.

On the other hand, in the field of ink-jet printing technology, methods of applying ink and treatment liquid that reacts with the applied ink have been proposed in order to improve the quality of printed characters and images (e.g., in terms of the water resistance and the optical density (OD) of the image formed on a printing medium) by causing the applied ink and the treatment liquid to favorably react each other on the printing medium. Some of such methods have already found practical applications.

SUMMARY OF THE INVENTION

As a result of researches conducted by the inventors of the present invention for dissolving the problems specific to pigment ink, while exploiting the advantages thereof, they obtained the following findings.

When a pigment ink where the pigment is dispersed by a polymeric dispersant is applied onto a plain paper by means of an ink-jet recording method, the pigment particles contained in the ink aggregate due to the penetration into the paper and evaporation of the solvent of ink, which is typically water. Now, in terms of the behavior of the ink on the paper, the more the amount of the polymeric dispersant is contained in the ink, the stronger the aggregational force of the ink is, which shows that the aggregational force is stronger when the polymeric dispersant is contained in the ink at a higher rate. As a result, the ink dot formed on the recording medium with the ink containing a polymeric dispersant at a higher rate tends to have a smaller diameter than that formed with the ink containing it at a lower rate, provided that a predetermined volume of ink is ejected from an in-jet head, and keep a distorted profile produced as a result of the collision of the ink with the surface of the sheet of paper. Therefore, in order to obtain ink dots showing a sufficient recording density and having a dot diameter necessary for forming an image without generating white stripes, it is necessary to increase the volume of ink ejected from the ink-jet head. However, the fixation of the ink to the printing medium may take longer time and the scratch resistance of the recorded image may be reduced because of the strong aggregational force of the pigment particles around which the polymeric dispersant are absorbed.

The use of a penetrant may be conceivable to improve the ink permeability of the printing medium in order to increase the ink dot diameter and improve the fixation of the ink to the printing medium. However, the use of a penetrant can be accompanied by a problem of a degraded ink dot profile (a degraded circumferential profile of each ink dot, due to a phenomenon typically referred to as feathering) and that of permeation of ink to the rear surface of the paper (so-called back-through) that are undesirable for producing high quality recorded images. Additionally, even if the ink dot diameter is relatively increased, the OD (optical density) of the ink dot may not be raised because the coloring material of the ink can penetrate into the printing medium.

Meanwhile, ink containing a self-dispersible pigment has been proposed. With such ink, the dot diameter can be increased because the self-dispersible pigment contained in ink has aggregational force weaker than that of ordinary ink pigment that is dispersed by a dispersant when applied onto the surface of paper. However, it is not enough for producing high quality color images.

Under the above identified circumstances, the inventors of the present invention have done intensive research on developing the ink-jet recording technology to make it highly satisfactory in terms of various factors that affect the quality of the recorded image is including fixation of ink, enlargement of ink dot diameter, uniformity of density in each ink dot, and a high optical density of each ink dot. In the course of the researches, the inventors experimented a recording process where pigment ink was used solely and another recording process where pigment ink was used with treatment liquid that was highly reactive to the pigment ink and could destabilize the dispersibility of the pigment at the time of recording for the purpose of comparison. In the latter recording process, pigment ink was applied onto the printing medium immediately before or after the application of the treatment liquid onto the printing medium in such a way that the applied pigment ink was mixed with the treatment liquid on the printing medium in a liquid state.

As a result, however, it was found that some of the obtained images showed an image quality that is far from satisfactory and worse than the quality of images formed by using only pigment ink. More specifically, in the case of a combination of pigment ink containing a pigment that was dispersed in an aqueous medium by means of a polymeric dispersant and treatment liquid that reacts with such ink, the produced ink dots showed a low optical density (OD) probably because of a small area factor of the ink dots. Although why such a phenomenon occurred is not clear, the inventors presume that the aggregation of pigment in the ink was greatly accelerated by the treatment liquid on the printing medium.

The area factor may be raised to enhance the OD by increasing the shot-in quantity of pigment ink per unit area of the printing medium. Then, however, the fixation of ink can sometimes be worsened. In the case of a combination of pigment ink containing a self-dispersible pigment and a treatment liquid that reacts with such pigment ink, it showed the phenomenon of so-called exudation or haze along the circumferences the dots formed on the printing medium to blur the profiles of the dots.

FIG. 1 of the accompanying drawings schematically illustrates a dot showing such exudation or haze. As shown in FIG. 1, the phenomenon of exudation or haze 7 can be observed along the reaction zone of the pigment ink 8 that is located at the center and the surrounding treatment liquid 6.

FIGS. 2A through 2C of the accompanying drawings schematically illustrate the presumed mechanism of appearance of the phenomenon. After treatment liquid S is applied onto a printing medium P (a sheet of plain paper in particular), pigment ink Ip containing a self-dispersion type pigment but not containing any polymeric dispersant is applied onto the treatment liquid S. Then, the treatment liquid S and the pigment ink Ip react each other to start producing a reaction product 2 (see FIG. 2B). As the reaction proceeds, exudation of the reaction product appears radially from the circular dot of ink as shown in FIG. 2C to make the entire dot appear as if it were surrounded by haze Such exudation or haze is apparently recognized as feathering that is a known phenomenon to consequently degrade the quality of printing.

The inventors of the present invention believes that such exudation or haze is a phenomenon that can be explained in a manner as described below in chemical or micro-dimensional terms. The pigment ink containing no dispersant reacts with the treatment liquid at a relatively high reaction rate so that some of the dispersed pigment particles are instantaneously subjected to dispersive destruction to produce clusters of the reaction product and, at the same time, micro-particles of the reaction product. Then, as shown in FIG. 2C, the particles of the reaction product start flowing out as the permeation front SP in the printing medium expands to consequently make exudation or haze appear.

As described above, a situation unpredictable to the inventors of the present occurred when pigment ink and treatment liquid were simply combined so that it was difficult to obtain a high quality image by ink-jet recording. As a result, the inventors realized that further efforts were required for technological development in order to achieve the initial object of eliminating the drawbacks of pigment ink, while utilizing the ink-jet recording process using treatment liquid and exploiting the advantages of pigment ink.

Furthermore, as pointed out above, a higher printing speed will be required to ink-jet printers in business applications where the demand for ink-jet printers is expected to rise dramatically. One of the large problems of high speed printers is the fixation of ink on a recording medium. If fixation of ink to the recording medium is not satisfactory in a process of successively discharging printed sheets of paper from an ink-jet printer and sequentially laying them one on the other, a second sheet of paper discharged from the ink-jet printer may be laid on the first sheet of paper while the ink on the surface of the first sheet of paper is not fixed enough so that there may arise a problem that the image on the first sheet of paper becomes blurred and/or the ink on the first sheet of paper sticks to the rear surface of the second sheet of paper to consequently damage the appearance of the printed sheets of paper. On the other hand, the demand for high quality color images to be produced by an ink-jet recording method has been intensified.

Thus, the present invention is based on the technological findings of the inventors of the present invention. It is an object of the present invention to provide an ink set that can be used to produce high quality color prints by utilizing the ink-jet recording technology using pigment ink and treatment liquid.

Another object of the present invention is to provide an ink-jet printing method and an apparatus therefor that can realize high speed fixation of ink to the recording medium without sacrificing the quality of the printed image.

In an aspect of the invention, the above objects are achieved by providing an ink set comprising first, second and third inks respectively containing aqueous media and coloring materials:

said first ink containing an anionic dye as coloring material;

said second ink containing an anionic dye as coloring material and having a lower coloring material content than said first ink;

said third ink containing a first pigment, a second pigment and a polymeric dispersant for dispersing said second pigment, both said first pigment and said second pigment being contained in said third ink in a dispersed state;

said first pigment being a self-dispersible pigment having an anionic group bound to the surface directly or via another atomic group;

said second pigment being a dispersible to said aqueous medium by means of said polymeric dispersant;

said polymeric dispersant containing at least either an anionic polymeric dispersant or a nonionic polymeric dispersant, said second ink further containing a substance which destabilizes the dispersion stability of at least either the first pigment or the second pigment in said third ink when the second ink is brought into contact with said third ink in a liquid state on a printing medium.

In another aspect of the invention, there is provided a color ink-jet recording method comprising steps of:

(1) applying a first ink containing an aqueous medium and an anionic dye as coloring material onto a printing medium by an ink-jet method;

(2) applying a second ink containing an aqueous medium and an anionic dye as coloring material and having a lower coloring material content than the first ink onto the printing medium by means of an ink-jet method; and (3) applying a third ink containing an aqueous medium, a first pigment, a second pigment and a polymeric dispersant for dispersing said second pigment, both said first pigment and said second pigment being contained in a dispersed state, onto the printing medium by an ink-jet method;

said first pigment being a self-dispersible pigment having an anionic group bound to the surface directly or via another atomic group;

said second pigment being dispersible to said aqueous medium by means of said polymeric dispersant;

said polymeric dispersant being at least either an anionic polymeric dispersant or a nonionic polymeric dispersant;

said second ink further containing a substance which destabilizes the dispersion stability of at least either the first pigment or the second pigment in said third ink when the second ink is brought into contact with said third ink in a liquid state on the printing medium;

said step (2) being carried out either subsequent to or practically simultaneously with said step (3) so as to make the second ink and the third ink contact each other in a liquid state on the printing medium.

In the above aspects of the invention, it is possible to provide a high quality image showing a high OD value and a good edge sharpness of the ink dot. Additionally, the obtained image is excellent in terms of scratch resistance, fixation and various other respects. While the reason why the application of the second ink containing a substance which destabilizes the dispersion stability of at least either the first pigment or the second pigment subsequently to or practically simultaneously with the application of the third ink containing the first pigment and the second pigment gives such an effect is not clear, the inventors of the present invention have confirmed the following facts as a result of a series of experiments carried out for the purpose of the present invention. As the third ink containing the first and second pigments is applied onto a printing medium, a dot of ink is formed on the surface of the printing medium P with a given diameter as shown in FIG. 3A of the accompanying drawings. The size (diameter d1) of the dot is greater than that (diameter d2) of a dot of conventional pigment ink (which may be ink where a pigment is dispersed by a polymeric dispersant or ink containing a self-dispersible pigment) (d1>d2). While the reason why such a phenomenon is observable is not clear, the inventors presume that the following process proceeds there. The second pigment absorbing the polymeric dispersant and the first pigment electrically repulse each other so that the aggregational force of the pigments of the third ink is made weaker than that of ink containing only a pigment being dispersed by a polymeric dispersant. As an image is printed on the surface of the paper by means of the third ink, it is difficult for the coloring materials in the ink to penetrate into the sheet of paper in a direction perpendicular to the paper because the polymeric dispersant is adsorbed to the second pigment. Concerning along the surface of the paper, the ink containing only the second pigment and the polymeric dispersant would aggregate strongly because polymer molecules become rapidly intertwined with each other in the ink due to the penetration into the paper and/or evaporation of the solvent of the ink because molecules of the pigment are mostly cross-linked by polymer molecules. On the other hand, the first pigment contained in the third ink according to the invention prevents and suppresses the intervolution and/or the cross-linking and the inter-molecular force of the pigments in the ink is reduced by the mutual repulsion of the first pigment and the polymeric dispersant so that consequently the applied ink can easily be spread along the surface of the sheet of paper and the spread is not disorderly because the aggregational force of the pigments is reduced but still there to influence the spread of ink.

Then, as the second ink containing a substance that destabilizes the dispersion stability of at least either the first pigment or the second pigment is applied to the dot of the ink that has been uniformly spread on the surface of the printing medium (see FIGS. 2A and 2C of the accompanying drawings) the substance in the second ink reacts with at least either the first pigment or the second pigmentin the third ink at the interface of the second ink and the third ink. However, since the dot of the third ink has been expanded to a large extent as pointed out above, the second ink reacts with the third ink over a large area. Additionally, since the height (t1) of the ink dot is reduced if compared with that (t2) of a comparable dot of conventional ink, the reaction between the third ink and the second ink will be completed in a short period of time. As a result, there is a remarkable improvement in the image of the dot of the ink set according to the invention in terms of fixing time and the level of fixation and also in the edge sharpness of the ink dot. Thus, it will be appreciated that effects of the present invention attributable to the above process is specific to the system where the third ink is applied onto the printing medium before or practically simultaneously with the second ink.

The fixing property and the edge sharpness of the ink dot are further improved when the second ink is made to be able to penetrate into the printing medium at an enhanced rate. This is probably because the solvent containing water is made to permeate well into the printing medium by the permeation effect of the second ink, while the third ink and the second ink are reacting each other on the surface of the printing medium. Generally, when a coloring material is made to permeate into a printing medium, the optical density of the coloring material is reduced. However, when the third ink is applied before the application of the second ink in a manner as described above for the purpose of the invention, the pigments contained in the third ink would not permeate into the printing medium so as to reduce the OD value. Rather, the coloring materials in the third ink would remain on and near the surface of the printing medium as a result of the reaction with the substance in the second ink so that the OD of the coloring materials of the third ink is improved if compared with the case where the second ink is not used.

In still another aspect of the invention, there is also provided an ink-jet recording method comprising steps of:
(1) applying a first ink containing an aqueous medium and an anionic dye as coloring material onto a printing medium by an ink-jet method;
(2) applying a second ink containing an aqueous medium and an anionic dye as coloring material and having a lower coloring material content than the first ink onto the printing medium by means of an ink-jet method; and
(3) applying a third ink containing an aqueous medium, a first pigment, a second pigment and a polymeric dispersant for dispersing said second pigment, both said first pigment and said second pigment being contained in a dispersed state, onto the printing medium by an ink-jet method;

said first pigment being a self-dispersible pigment having at least an anionic group bound to the surface directly or via another atomic group;

said second pigment being dispersible to said aqueous medium by means of said polymeric dispersant;

said polymeric dispersant containing at least either an anionic polymeric dispersant or an nonionic polymeric dispersant;

said second ink further containing a substance which destabilizes the dispersion stability of at least either the first pigment or the second pigment in said third ink when the second ink is brought into contact with said third ink in a liquid state on the printing medium;

said step (3) being carried out either subsequent to or practically simultaneously with said step (2) so as to make the second ink and the third ink contact each other in a liquid state on the printing medium.

The above described methods according to the invention provides a high quality image showing a high OD value and significantly free from haze. Additionally, the obtained image is excellent in terms of scratch resistance, fixation and various other respects. While the reasons of the above advantages of the methods according to the invention are not clear, the inventors of the present invention have confirmed the following facts as a result of a series of experiments carried out for the purpose of the present invention. Firstly, when the third ink is applied to an area of a printing medium where the second ink containing a material which destabilizes the dispersion stability of at least either the first pigment or the second pigment has been applied in such a way that the two inks are laid one on the other in a liquid state or held in contact with each other, the ink dots in the area where the second ink has been applied expand considerably to produce ink dots showing a large diameter. Thus, presumably, the effect of aggregation of the second ink and at least either the first pigment or the second pigment in the third ink is alleviated as a result of the coexistence of the first pigment or the second pigment, whichever appropriate, in the third ink and the second ink containing the substance which destabilizes the dispersion stability of at least either the first pigment or the second pigment.

More specifically, the aggregation caused by the strong reaction of the third ink and the second ink containing a substance which destabilizes the dispersion stability of at least either the first pigment or the second pigment is alleviated by the weaker reaction of the other pigment and the second ink and additionally the strong intermolecular force of the second pigment in the reactive solution is alleviated by the existence of the first pigment. The tendency of ink of spread transversally on a paper observed in a number of experiments may be attributable to the above fact.

Still additionally, since the first pigment tends to aggregate more strongly than the second pigment, haze is practically not observable after the reaction of the second ink and the first pigment when the second ink contains a substance that destabilizes the dispersion stability of the second pigment so that the edge sharpness is improved even when the dot diameter is increased.

The ink shows an excellent fixing property since a large dot diameter can be realized with a small amount of ink as pointed out above, and the first pigment makes it possible to add the polymeric dispersant to the third ink at a reduced rate to ink.

The fixing property and the dot diameter are further improved when the second ink having a high permeability rate. The treatment liquid will form a sort of ink receiving layer on the printing medium since it permeates and is spread on the printing medium. The ink receiving layer makes the ink which is subsequently applied penetrate into and spread on the printing medium quickly while reacting with each other. Consequently, a larger ink dot will be formed on the printing medium quickly.

Preferably, according to the invention, the second ink is optimized in terms of the concentration of the substance which destabilizes the dispersion stability of at least either the first pigment or the second pigment in order to further improve the image quality. The OD of the ink dot will be sufficiently high when the concentration of the substance which destabilizes the dispersion stability of at least either the first pigment or the second pigment is about ⅓ of that of the pigment in the third ink so that the former does not need to be raised excessively. The fixation of the third ink is also optimized when the concentration of the substance adapted to destabilize the dispersion stability of at least either the first pigment or the second pigment is lower than the concentration of the pigment.

Additionally, the second ink that operates as treatment liquid is applied at a rate of ⅛ to ½ of the rate of application of the third ink to improve the OD and the edge sharpness of the formed image.

Thus, it is possible to form a high quality image showing a high OD value and an excellent fixing property with a short fixing time on a printing medium without giving rise to any haze by laying the second ink on or under the third ink so as to make them to be held in contact with each other in order to realize the above process.

For instance, an image showing a wide color reproduction range and giving little granular impression over the entire gradation can be obtained by making the second ink that operates as treatment liquid for the purpose of the invention (and containing an anionic dye having the same tonic property as the first ink and a substance adapted to destabilize the dispersion stability of at least either the first pigment or the second pigment) paler than the first color ink and combining the first and the second ink with the third pigment ink. Then, the image quality will be further improved by using a dye same as that of the first ink in the second ink. Since the dye concentration of the second ink is low, the asociation of the dye and the substance adapted to destabilize the dispersion stability of at least either the first pigment or the second pigment is little so that the second ink will remain stable. Further a high quality ink-jet image can be obtained when the third ink is black ink because the image quality of the black image is improved.

In still another aspect of the invention, there is provided a recording unit for ink-jet recording using the inks of an ink set according to the invention, said recording unit comprising an ink container containing the respective inks and a head section for ejecting the respective inks.

In still another aspect of the invention, there is also provided an ink cartridge comprising an ink container containing the respective inks of an ink set according to the invention.

In a further aspect of the invention, there is also provided an ink-jet printing apparatus comprising an ink container containing the respective inks of an ink set according to the invention and a recording head for ejecting the respective inks.

BRIEF DESCRIPTION OF THE DRAWINGS

FIG. 1 is a schematic and presumptive illustration of a dot showing such exudation that appears when ink and a treatment liquid are made to react each other.

FIGS. 2A, 2B and 2C are schematic and presumptive illustrations showing how an ink dot is formed when a treatment liquid is applied to a printing medium and subsequently ink is applied thereto in order to make the treatment liquid and the ink react each other.

FIGS. 9A, 9B and 9C are schematic illustrations of head arrangements that can be used in a printing apparatus for the purpose of the invention.

Figure 3A:
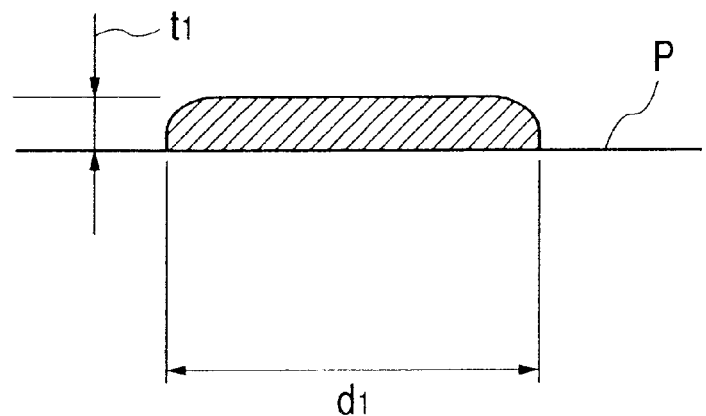
FIG. 3A is a schematic illustration of an ink dot of ink according to the invention that is formed on a printing medium.
Figure 3B:
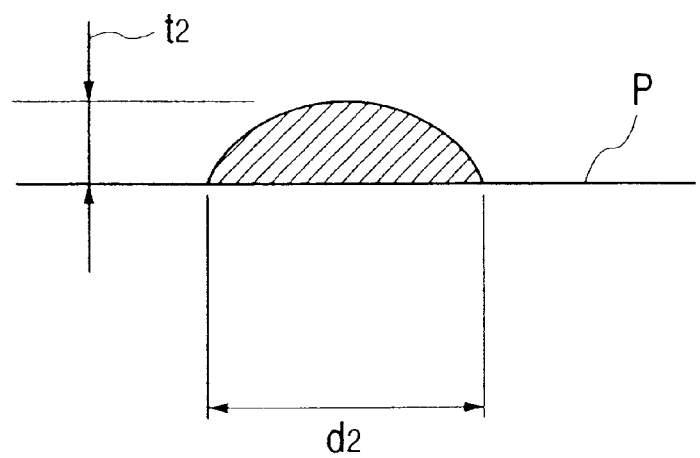
FIG. 3B is a schematic illustration of an ink dot of conventional pigment ink.

DESCRIPTION OF THE PREFERRED EMBODIMENTS (First Mode of Carrying out the Invention)

This mode of carrying out the invention is characterized by the use of:

(1) a first ink containing in an aqueous medium an anionic dye as coloring material;

(2) a second ink containing in an aqueous medium an anionic dye as coloring material at a density lower than that of the first ink and a substance adapted to destabilize the dispersion stability of at least either the first pigment or the second pigment in a third ink upon being brought into contact with the third ink in a liquid state on a printing medium; and (3) a third ink containing a first pigment, a second pigment and a polymeric dispersant adapted to disperse the second pigment, both the first pigment and the second pigment being contained in the third ink in a dispersed state;

the first pigment being of a self-dispersion type and containing at least an anionic group coupled to the surface of the first pigment directly or by way of another atomic group;

the second pigment being of a type adapted to be dispersed in the aqueous medium by means of the polymeric dispersant;

the polymeric dispersant being at least either a polymeric dispersant showing a polarity same as that of the group coupled to the surface of the first pigment or an nonionic polymeric dispersant.

An ink-jet printing method according to the first mode of the invention is characterized by comprising:

(1) a step of applying the first ink onto a printing medium by means of an ink-jet method;

(2) a step of applying the second ink onto the printing medium by means of an ink-jet method; and (3) a step of applying the third ink onto the printing medium by means of an ink-jet method;

the second step being carried out either immediately following or practically simultaneously with the third step so as to make the second ink and the third ink contact each other in a liquid state on the printing medium.

If the third ink is black ink and the first and second inks are color inks, the color image formed by an ink-jet printing method according to this mode provides a good image quality by causing the area where the second ink and the third ink are held in contact with each other to contain the edges of the black image formed by the black ink that are exposed to the boundary zone of the black image and the color image.

Now, each of the inks that are used in this mode of carrying out the invention will be described below.

(First Ink)

The first ink according to the invention is preferably an aqueous ink containing an anionic dye. The anionic dye that is used for the purpose of the invention may be selected from water-soluble dyes adapted to be used as ink for ink-jet recording, including acid dyes, direct dyes, reactive dyes and food dyes. Any known anionic dyes and newly synthesized dyes can be candidates for the purpose of the invention so long as they provide an appropriate color tone and an appropriate density when used for forming an image. Two or more than two such dyes may be used in the form of a mixture.

Specific examples of anionic dyes that can be used for the purpose of the invention will be listed below and grouped for each color.

(Coloring Materials for Yellow)
C. I. Direct Yellow: 8, 11, 12, 27, 28, 33, 39, 44, 50, 58, 85, 86, 87, 88, 89, 98, 100, 110;
C. I. Acid Yellow: 1, 3, 7, 11, 17, 23, 25, 29, 36, 38, 40, 42, 44, 76, 98, 99;
C. I. Reactive Yellow: 2, 3, 17, 25, 37, 42;
C. I. Food Yellow: 3.
(Coloring Materials for Red)
C. I. Direct Red: 2, 4, 9, 11, 20, 23, 24, 31, 39, 46, 62, 75, 79, 80, 83, 89, 95, 197, 201, 218, 220, 224, 225, 226, 227, 228, 229, 230;
C. I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, 289;
C. I. Reactive Red: 7, 12, 13, 15, 17, 20, 23, 24, 31, 42, 45, 46, 59;
C. I. Food Red: 87, 92, 94.
(Coloring Materials for Blue)
C. I. Direct Blue: 1, 15, 22, 25, 41, 76, 77, 80, 86, 90, 98, 106, 108, 120, 158, 163, 168, 199, 226;
C. I. Acid Blue: 1, 7, 9, 15, 22, 23, 25, 29, 40, 43, 59, 62, 74, 78, 80, 90, 100, 102, 104, 117, 127, 138, 158, 161;
C. I. Reactive Blue: 4, 5, 7, 13, 14, 15, 18, 19, 21, 26, 27, 29, 32, 38, 40, 44, 100.
(Coloring Materials for Black)
C. I. Direct Black: 17, 19, 22, 31, 32, 51, 62, 71, 74, 112, 113, 154, 168, 195;
C. I. Acid Black: 2, 48, 51, 52, 110, 115, 156;
C. I. Food Black: 1, 2.

While the content of the coloring material in the ink may be appropriately selected in such a way that the ink shows excellent ink ejection characteristics along with a desired color tone and a desired density. As a rule of thumb, the content of the coloring material in the first ink is preferably between 2 and 5 wt % of the total weight of the first ink. The content of water in the first ink is preferably between 50 and 95 wt % of the total weight of the first ink.

The solvent or the dispersion medium to be used for preparing the ink may be simply water or a mixture medium containing both water and a water-soluble organic solvent. Examples of water-soluble organic solvents that can be used for the purpose of the invention include amides such as dimethylformamide and dimethylacetoamide; ketones such as acetone; ethers such as tetrahydrofuran and dioxane; polyalkyleneglycols such as polyethyleneglycol and polypropyleneglycol; alkyleneglycols such as ethyleneglycol, propyleneglycol, butyleneglycol, triethyleneglycol, 1,2,6-hexanetriol, thiodiglycol, hexyleneglycol and diethyleneglycol; lower alkylethers of polyhydric alcohols such as ethyleneglycolmonomethylether, diethyleneglycolmonomethylether and triethyleneglycolmonomethylether; and monohydric alcohols such as ethanol, isopropyl alcohol, n-butyl alcohol and isobutyl alcohol as well as glycerol, N-methyl-2-pyrrolidone, 1,3-dimethyl-2-imidazolidinone, triethanol amine, sulforan and dimethylsulfoxide. Any of the above listed water-soluble organic solvents may be used independently or as mixture. While there is no limit to the content of the water-soluble organic solvent for the purpose of the invention, it is preferably less than 60 wt %, more preferably between 5 and 40 wt % of ink.

For causing the first ink to adhere to a recording medium by means of an ink-jet recording method (e.g., a bubble-jet method), the color ink is preferably so prepared as to show a desired viscosity and a desired surface tension so that it may show excellent ink-jet ejection characteristics.

When the first ink is used as color ink, the Ka value that can be determined by a Bristow method as index indicating the permeability of ink into the recording medium is preferably held above 5. Then, a high quality color image can be formed on the recording medium if black ink is used as the third ink for the purpose of the invention. More specifically, since ink showing such a high Ka value can permeate well into the recording medium, if two images are formed side by side in two different colors that are selected from yellow, magenta and cyan, the phenomenon of bleeding between two adjacent images can be minimized. Additionally, bleeding that can appear between two adjacent images can also be minimized when forming a bicolor image by shooting two inks one on the other because each of the inks show a high permeability. The Ka value of a color ink can be regulated to such a level by typically by adding a surfanctant or a permeative solvent such as glycol ether to the ink at a rate that can be regulated as a function of the Ka value.

(Second Ink)

The second ink contains an anionic dye and a substance adapted to destabilize the dispersion stability of at least either the first pigment or the second pigment in the third ink in an aqueous solvent. For the purpose of the present invention, destabilization of the dispersion stability of a pigment refers to formation of aggregates and/or precipitates and/or a rise in the ink viscosity. A rise in the ink viscosity by turn refers to a phenomenon where a mixture of two inks (the third ink and the second ink) shows a viscosity level higher than that of at least either of the two inks. Materials adapted to destabilize the dispersion stability of at least either the first pigment or the second pigment include cations of at least a polyvalent metal. Examples of cations of polyvalent metals that can be used for the purpose of the invention include $Ca^{++}$, $Cu^{++}$, $Ni^{++}$, $Mg^{++}$, $Zn^{+++}$, $Ba^{++}$, $Al^{+++}$, $Fe^{+++}$, $Cr^{+++}$, $Co^{++}$, $Fe^{++}$, $La^{++}$, $Nd^{+++}$ and $Y^{+++}$ may be used, any of which may be used independently or in combination with others.

Anions that can be coupled with these cations to form a salt typically include $Cl^-$, $NO_3^-$, $I^-$, $Br^-$, $ClO_3^-$ and $CH_3COO^-$, although not limited thereto.

The solution containing cations of any of the above listed polyvalent metals or a salt thereof shows a concentration preferably between 0.01 and 10% by weight, more preferably between 1 and 5% by weight, most preferably between 1 and 3% by weight.

The second ink contains an aqueous solvent in addition to the anionic dye and the substance adapted to destabilize the dispersion stability of at least either the first pigment or the second pigment in the third ink. The aqueous solvent contains either only water or water and a water-soluble organic solvent and may additionally contain one or more than one additives.

The water-soluble organic solvent can be selected from amides such as dimethylformamide, dimethylacetamide; ketones such as acetone; ethers such as tetrahydrofuran and dioxane; polyalkyleneglycols such as polyethyleneglycol and polypropyleneglycol; alkyleneglycols such as ethyleneglycol, propyleneglycol, butyleneglycol, triethyleneglycol, 1,2,6-hexanetriol, thiodiglycol, hexyleneglycol and diethyleneglycol; lower alkylethers of polyhydric alcohols such as ethyleneglycolmethylether, diethyleneglycolmonomethylether; and triethyleneglycolmonomethylether and monohydric alcohols such as ethanol, isopropyl alcohol, n-butyl alcohol and isobutyl alcohol; as well as glycerol, N-methyl-2-pyrrolidone, 1-3-dimethylimidazolidnone, triethanolamine, sulforan and dimethylsulfoxide. One or more than one of the above listed solvents may be used for the purpose of the invention. While the content of the water-soluble organic solvent is not subjected to any particular limitations, it is preferably between 5 and 60 wt %, more preferably between 5 and 40 wt % of the entire second ink.

The anionic dye of the second ink may be selected from those listed above for the first ink. However, from the viewpoint of preventing ions of the polyvalent metal from associating to an enhanced extent, the anionic dye is preferably selected from C. I. Acid Yellow 23; C. I. Acid Red 52, 289; C. I. Acid Blue 9; C. I. Reactive Red 180; C. I. Direct Blue 189, 199; and a magenta dye expressed by structural formula (I) below;

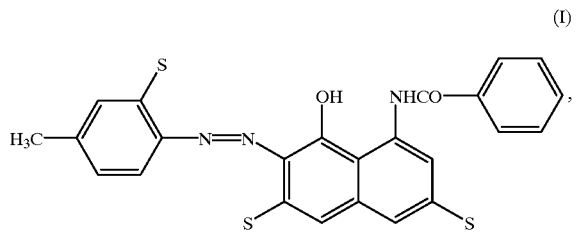

where S represents $SO_3X$ (where X represents an alkali metal such as Na, Li or the like). Any of the above listed dyes may be used independently or in combination with others. Since the concentration of the particles of the coloring material of the second ink is lower than the first ink, they show a relatively low probability of association with ions of the polyvalent metal to provide a high degree of freedom for the dye selection. Additionally, since the concentration of ions of the polyvalent metal is relatively low as pointed out above, even a higher degree of freedom is provided for the dye selection.

In this mode of carrying out the invention, the second ink is preferably so regulated as to show a high permeability relative to the printing medium in order to improve the fixing speed and the degree of fixation of dot images relative to the printing medium.

(Third Ink)

The third ink that can be used in this mode of carrying out the invention contains a first pigment and a second pigment in an aqueous medium in a dispersed state, where the first pigment is a self-dispersible and contains at least an anionic group bound to the surface directly or via another atomic group. The third ink further contains a polymeric dispersant containing at least either a polymeric dispersant showing a polarity same as that of the group coupled to the surface of said first pigment or an nonionic polymeric dispersant in order to disperse the second pigment.

Now, the ingredients of the ink will be described in greater detail below.

(First Pigment)

A self-dispersion type pigment refers to a pigment that can be stably held in a dispersed state in water, a water-soluble organic solvent or a mixture liquid thereof without using a dispersant such as a water-soluble polymer and does not produce any aggregates of pigments in the liquid that can obstruct any normal ejection of ink from an orifice by means of an ink-jet recording technique.

(Anionic Self-Dispersing Carbon Black)

Such a pigment may typically contain at least an anionic group coupled to the surface of said first pigment directly or by way of another atomic group. Specific examples include carbon black containing at least an anionic group coupled to the surface directly or by way of another atomic group.

Examples of anionic groups that can be coupled to such carbon black include —COOM, —$SO_3M$, —$PO_3HM$ and —$PO_3M_2$ (where M represents a hydrogen atom, an alkali metal, ammonium or an organic ammonium compound).

Examples of alkali metals that can be represented by above include lithium, sodium and potassium. Examples of organic ammonium compounds that can be represented by above include mono- to trimethylammoniums mono- to triethylammoniums and mono- to trimethanolammoniums.

Of the above anionic groups, the use of —COOM or —$SO_3M$ is preferable because they are highly effective for stabilizing the dispersed state of carbon black.

Meanwhile, it is preferable for the purpose of the invention that the selected one of the above listed anionic groups is coupled to the surface of carbon black by way of another atomic group. Examples of atomic groups that can be used as another atomic group include straight chain type and branched chain type alkylene groups with 1 to 12 carbon atoms, substituted and unsubstituted phenylene groups and substituted and unsubstituted naphthylene groups. Examples of substituents that may be bonded to a phenylene group or a naphthylene group for the purpose of the invention include straight chain type and branched chaing type alkylene groups with 1 to 6 carbon atoms.

Specific examples of anionic group that can be coupled to the surface of carbon black by way of another atomic group include —$C_2H_4COOM$, —$PhSO_3M$ and —PhCOOM (where Ph represents a phenyl group and M is defined same as the above cited one), although the present invention is by no means limited thereto.

Carbon black where an anionic group is coupled to the surface directly or by way of another atomic group can typically be prepared in a manner as described below.

A method that can be used for introducing —COONa to the surface of carbon black consists in treating commercially available carbon black with sodium hypochlorite. A method that can be used for introducing an —Ar—COONa group (where Ar represents an aryl group) consists in producing a diazonium salt by causing nitrous acid to react with an $NH_2$—Ar—COONa group and then causing the diazonium salt to be coupled to the surface of carbon black, although the present invention is by no means limited thereto.

For the purpose of the present invention, 80% or more of the self-dispersion type pigment (first pigment) to be contained ink in this mode of carrying out the invention shows a particle diameter preferably between 0.05 and 0.3 μm, more preferably between 0.1 and 0.25 μm. A method that can be use for regulating ink to meet the above requirement will be discussed in Examples that will be described hereinafter.

(Second Pigment)

The second pigment to be used in ink in this mode of carrying out the invention is selected from pigments that can be dispersed in the dispersion medium of ink, which may typically be an aqueous medium, by the effect of a polymeric dispersant. In other words, pigments that can be stably dispersed in an aqueous medium only when the polymeric dispersant is adsorbed to the surface of pigment particles can preferably be used for the purpose of the present invention. Such black pigments typically include carbon black pigments such as furnace black, lamp black, acetylene black and channel black. Specific examples of carbon black pigments listed below can be used alone or in combination.

Carbon Black Pigments:

Raven 7000, Raven 5750, Raven 5250, Raven 5000 ULTRA, Raven 3500, Raven 2000, Raven 1500, Raven 1250, Raven 1200, Raven 1190 ULTRA-II, Raven 1170, Raven 1255 (tradenames, available from Columbia).

Black Pearls L, Regal 400R, Regal 330R, Regal 660R, Mogul L, Monarch 700, Monarch 800, Monarch 880, Monarch 900. Monarch 1000. Monarch 1100, Monarch 1300, Monarch 1400, Valcan XC-72R (tradenames, available from Cabot).

Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, Special Black 4 (tradenames, available from Degussa).

No. 25, No. 33, No. 40, No. 47, No. 52, No. 900, No. 2300, MCF-88, MA600, MA7, MA8, MA100 (tradenames, available from Mitsubishi Chemical Corp.).

Other black pigments that can be used for the purpose of the present invention include magnetic micro-particles of magnetite and ferrite and titanium black.

In addition to the above listed black pigments, blue pigments and red pigments can also be used for the purpose of the invention.

For the purpose of the invention, the content of the coloring materials including the first and second pigments is preferably between 0.1 and 15 wt %, more preferably between 1 and 10 wt % with reference to the total weight of ink. The masks ratio of the first pigment to the second pigment is preferably between 5/95 and 97/3, more preferably between 10/90 and 95/5. Most preferably, the ratio of the first pigment to the second pigment is between 4/6 and 9/1. From another point of view, it is preferable that the first pigment is contained to such a larger extent then the second pigment. As the first pigment is contained to such a large extent, it is possible to realize a high dispersion stability of ink, a high ejection stability of the ink-jet head and a high stability in terms of reliability due a high ejection efficiency and a scarcely wet ejection port surface.

Additionally, in view of the fact that ink containing the second pigment adsorbing the polymeric dispersant to a small extent can spread effectively along the surface of paper, it may be safe to presume that a uniform thin film of the polymeric dispersant is formed on the surface so that consequently the image formed on the surface of paper shows a high scratch resistance.

The polymeric dispersant that is designed to disperse the second pigment in the aqueous medium preferably has a function of being adsorbed to the surface of the particles of the second pigment so as to stably disperse the second pigment in the aqueous medium. Examples of polymeric dispersants that can be used for the purpose of the invention include anionic polymeric dispersants and nonionic polymeric dispersants.

(Anionic Polymeric Dispersant)

Examples of anionic polymeric dispersants that can be used for the purpose of the invention include polymers of a monomer operating as hydrophlic group and a monomer operating as hydrophobic group and salts thereof. Specific examples of monomers operating as hydrophilic group include styrenesulfonic acid, α,β-ethylenic unsaturated carboxylic acid, derivatives of α,β-ethylenic unsaturated carboxylic acid, acrylic acid, derivatives of acrylic acid, methacrylic acid, derivatives of methacrylic acid, maleic acid, derivatives of maleic acid, itaconic acid, derivatives of itaconic acid, fumaric acid and derivatives of fumaric acid.

Specific examples of monomers operating as hydrophobic group include styrene, derivatives of styrene, vinyltoluene, derivatives of vinyltoluene, vinylnaphthalene, derivatives of vinylnaphthalene, butadiene, derivatives of butadiene, isoprene, derivatives of isoprene, ethylene, derivatives of ethylene, propylene, derivatives of propylene alkyl esters of acrylic acid and alkyl esters of methacrylic acid.

For the purpose of the invention, cationic counter ions that can be used for forming a salt of any of the above polymers non-limitatively include hydrogen ion, alkali metal longs, ammonium ion, organic ammonium ions, phosphonium ion, sulfonium ion, oxonium ion, stibonium ion, stannonium ion, iodonium ion and other onium ions. Furthermore, if appropriate, polyoxyethylene group, hydroxy group, acrylamide, acrylamide derivatives, dimethylaminoethylmethacrylate, ethoxyethylmethacrylate, butoxyethylmethacrylate, ethoxytriethylenemethacrylate, methoxypolyethyleneglycolmethacrylate, vinylprrolidone, vinylpyridine, vinylalcohol or alkylether may be added to any of the above polymers or any of the salts thereof.

(Nonionic Polymeric Dispersant)

Examples of nonionic polymeric dispersants that can be used for the purpose of the present invention include polyvinylpyrrolidone, polypropyleneglycol and vinylpyrrolidone-vinyl acetate copolymer The appropriately selected combination of the first pigment, the second pigment and the polymeric dispersant are dispersed and dissolved in an aqueous medium to obtain the third ink to be used in this mode of carrying out the invention. If a self-dispersion type pigment containing at least an anionic group coupled to the surface of said first pigment directly or by way of another atomic group is used as the first pigment, the stability of ink can be secured by using the polymeric dispersant containing at least either an anionic polymeric dispersant or a nonionic polymeric dispersant in cobination.

While the ratio of the second pigment to the polymeric dispersant for dispersing the former is preferably between 5:0.5 and 5:2 by weight, the present invention is by no means limited thereto.

(Aqueous Medium)

The aqueous medium to be used as medium for dispersing the first and second pigments may be simply water or contain both water and a water-soluble organic solvent. Examples of water-soluble organic solvents that can be used for the purpose of the invention include alkyl alcohols with 1 to 5 carbon atoms such as methyl alcohol, ethyl alcohol, n-propyl alcohol, isopropyl alcohol, n-butyl alcohol, sec-butyl alcohol, tert-butyl alcohol, isobutyl alcohol and n-penthanol; amides such as dimethylformamide and dimethylacetamide; ketones and keto alcohols such as acetone and diacetone alcohol; ethers such as tetrahydrofuran and dioxane; oxyethylene or oxypropylene copolymers such as diethyleneglycol, triethyleneglycol, tetraethyleneglycol, dipropyleneglycol, tripropyleneglycol, polyethyleneglycol and polypropyleneglycol; alkyleneglycols having an alkylene group with 2 to 6 carbon atoms such as ethyleneglycol, propyleneglycol, trimethyleneglycol, triethyleneglycol and 1,2,6-hexanetriol; glycerol; lower alkylethers such as ethyleneglycolmonomethyl(or ethyl)ether, diethyleneglycolmonomethyl(or ethyl) ether and triethyleneglycolmonomethyl(or ethyl) ether; lower dialkylethers of polyhydric alcohols such as triethyleneglycoldimethyl(or ethyl)ether and tetraethyleneglycoldimethyl(or ethyl)ether; alkanol amines such as monoethanol amine, diethanol amine, triethanol amine; sulforan, N-methyl-2-pyrrolidone, 2-pyrrolidone and 1,3-dimethyl-2-imidazolidinone. Any of the above listed water-soluble organic solvents may be used independently or as mixture.

(Ink Permeability of Recording Medium Relative to the Third Ink)

With regard to the permeability of the printing medium relative to ink containing the above described ingredients, if the Ka value is adjusted to less than 1 (ml·m$^{-2}$·msec$^{-1/2}$) and ink is used in combination with a treatment liquid in a manner as will be described hereinafter, it is possible to produce image dots that show a highly uniform density and sharp edges and are outstanding in terms of fixing speed and fixing effect relative to the printing medium. Now, the permeability of the printing medium relative to ink will be discussed below.

When the ink permeability of the recording medium is expressed in terms of the volume of ink per m$^2$, it is known that the volume of ink V (ml/m$^2$=$\mu$m) that permeates the recording medium per unit area at time t after the ejection of ink drops is expressed by Bristow formula as shown below;

$$V=Vr+Ka\ (t-tw)^{1/2},$$

where t>tw.

Immediately after ink drops are made to fall onto the surface of printing medium, ink is mostly absorbed by the undulations on the surface (the coarse areas of the surface) of the recording medium and practically does not penetrate into the inside of the printing medium. The time of duration of this stage is expressed by tw (wet time) and the volume of ink absorbed by the undulations on the surface of the printing medium is expressed by Vr. When the elapsed time since the fall of ink drops exceeds tw, the volume of ink V permeated the printing medium increases by an amount proportional to the ½-th power of the time exceeding tw, or (t−tw). Ka is the constant of proportionality for the increase, which is determined as a function of the rate of permeation.

The value of Ka was determined in an experiment by means of a dynamic permeability testing apparatus S for liquid that utilizes the Bristow formula (available from Toyo Seiki). In the experiment, PB paper available from Canon who is the applicant of the present patent application (or assignee of the patent to be sought) was used as printing medium (recording paper). PB paper refers to recording paper that can be used for both copying machines and LBPs utilizing electrophotography and printing operations using ink-jet recording apparatus.

In the experiment, PPC paper available from Canon that is developed also for electrophotography was also used to obtain similar results.

The Ka value is determined as a function of the type and the amount of the surfactant that is used. For instance, the permeability is raised when a nonionic surfactant containing ethyleneoxide-2,4,7,9-tetramethyl-5-decyne-4,7-diol (to be expressed hereinafter by "Acetylenol": tradename, available from Kawaken Fine Chemical) is added.

The printing medium shows a low permeability to ink containing no Acetylenol (content: 0%) so that the ink may be referred to as ink of the surface borne type, which will be defined hereinafter. The printing medium shows a high permeability to ink containing Acetylenol by 1% so that the ink quickly permeates the recording medium and may be referred to as ink of the high permeability type, which will also be defined hereinafter. The printing medium shows a medium permeability to ink containing Acetylenol by 0.35% so that the ink moderately permeates the recording medium and may be referred to as ink of the intermediate permeability type, which will also be defined hereinafter.

TABLE 1

|  | Ka value (ml/m$^2$ · msec$^{1/2}$) | Acetylenole EU content (%) | Surface tension (mN/m) |
|---|---|---|---|
| ink of surface borne type | less than 1 | 0 and less than 0.2 | 40 or more |
| ink of medium permeability type | not less than 1 and less than 5 | not less than 0.2 and less than 0.7 | not less than 35 and less than 40 |
| ink of high permeability type | not less than 5 | not less than 0.7 | less than 35 |

Table 1 above shows the Ka value, the content (%) of Acetylenol EH and the surface tension (mN/m) of ink of the surface borne type, those of the intermediate permeability type and those of the high permeability type. The printing medium, or the recording paper, shows a high permeability to ink when the Ka value is high and hence the surface tension is low.

As pointed out above, the values of Ka were determined in an experiment by means of a dynamic permeability testing apparatus S for liquid that utilizes the Bristow formula (available from Toyo Seiki). In the experiment, PB paper available from Canon was used as printing medium (recording paper). In the experiment, PPC paper available from Canon was also used to obtain similar results.

Ink defined as of the high permeability type contains Acetylenol by not less than 0.7% and good results were obtained by such ink in terms of permeability. In this mode of carrying out the invention, the reference value of permeability to ink is preferably less than the Ka value of ink of the surface borne type, or less than 1.0 (ml·m$^{-2}$·msec$^{-1/2}$), more preferably not more than 0.4 (ml·m$^{-2}$·msec$^{-1/2}$).

(Addition of Dye)

A dye may also be added to the third ink in the above described mode of carrying out the invention. Ink containing a dye in addition to the first pigment, the second pigment and the dispersant for dispersing the second pigment in an aqueous medium can form excellent image dots on a printing medium with a short fixing time when used with the second ink. While the aggregational force of the second pigment is lessened by the existence of the first pigment as described above, it is further lessened by the addition of the dye so that an uneven printed image due to cracks that can occur on a recording medium showing a poor ink absorption effect if compared with plain paper can be effectively prevented from taking place. The dye that is used for the purpose of the invention preferably shows the polarity same as that of the group coupled to the surface of the first pigment. Thus, the dye may be an anionic dye.

(Anionic Dye)

The anionic dye that is used for the purpose of this mode of the invention and soluble to an aqueous medium may be selected from known acid dyes, direct dyes and reactive dyes. The dye preferably shows a chemical structure having a disazo or trisazo base structure. It is also preferable to use two or more than two dyes showing different chemical structures. For the purpose of the invention, a dye other than a black dye such as cyan, magenta or yellow dye may be used if it does not significantly affect the color tone of ink.

(Ratio of Added Dye)

A dye may be added to ink in this mode of carrying out the invention at a rate between 5 to 60 wt % relative to the entire coloring materials contained in the third ink.

However, from the viewpoint of utilizing the effect of combining the first and second pigments, the dye is added by less than 50% relative to the entire coloring materials. In the case of ink to be used on plain paper with emphasis on the printing effect, the dye is added at a rate between 5 and 30 wt % relative to the entire coloring materials.

(Second Mode of Carrying out the Invention)

This mode of carrying out an ink-jet printing method according to the invention is characterized by using the above described first through third inks and comprising:
(1) a step of applying the first ink onto a printing medium by means of an ink-jet method;
(2) a step of applying the second ink onto the printing medium by means of an ink-jet method; and
(3) step of applying the third ink onto the printing medium by means of an ink-jet method;
the third step being carried out immediately following the second step so as to make the second ink and the third ink contact each other in a liquid state on the printing medium. Therefore, this mode of carrying out the invention differs from the first mode of carrying out the invention only in terms of the order of applying the second ink and the third ink.

As for the sequence of application of the third ink and the second ink (treatment liquid) onto the printing medium in this mode of carrying out the invention, the above described intended effect can be obtained so long as basically the third ink is applied to the printing medium after the application of the second ink.

When making arrangement for realizing the above sequence of application, using a serial type head for instance, same areas may be scanned for a number of times by interposing a paper advancing operation if such a scanning operation realizes the above sequence.

As described above, the third ink is applied to the printing medium immediately after the application of the second ink to the printing medium. It should be noted here once again that it is not necessary to apply a single drop of ink at a time. For instance, a couple of drops of the third ink may be applied immediately after applying the second ink. If such is the case, it is preferable that the ink drop applied first of the two contains the second pigment more than the first pigment, whereas the ink drop applied subsequently contains the first pigment more than the second pigment.

When a number of ink drops are applied in a manner as described above, the total volume of the applied ink is preferably made substantially equal to the amount of ink that is applied at a time. In other words, in this mode of carrying out the invention, if a given volume of ink is divided and applied in a number of times, the volume of each drop becomes smaller as the number of times increases to obtain the intended effect.

There are basically no limitations to the time between the application of the second ink and that of the third ink in this mode of carrying out the invention so long as the intended result is obtained as in the case of the above described sequence of application.

The reaction of the applied inks may proceed differently depending on the time between the application of the second ink and that of the third. Even if the time is short, it has been observed that each dot formed by applying the inks one on the other on the printing medium shows a peripheral area, or an edge area, where the pigments and the second ink react satisfactorily to give rise to the effect of minimizing the appearance of haze of the present invention.

On the basis of these findings, the reaction between the third ink and the second ink refers not only to the overall reaction but also to every partial reaction that may occur in part of an area where the inks are applied one on the other. Such part may be an edge section of an ink dot, or such reaction may occur between the inks permeating the printing medium. For the purpose of the invention, any mode of reaction between the inks occurs in a state that is defined to be in contact with each other in a liquid state Printing heads that can be used in the above described first and second modes of carrying out an ink-jet printing method according to the invention include so-called full-multi-type printing heads whose ink ejection ports are arranged in an area corresponding to the entire width of the area to be printed of the printing medium that is moved and serial type printing heads adapted to be moved for scanning the printing medium.

While any known ink ejection method such as piezo method may be used for the printing heads in the above described first and second modes of carrying out an ink-jet printing method according to the invention, a method of producing bubbles in ink by utilizing thermal energy and ejecting ink under the pressure of bubbles may most preferably be used for the purpose of the invention.

The areas where the inks that are ejected by the respective printing heads lie one on the other is normally controlled on a basis of the pixels of the printed image in such a way that the different types of ink and the treatment liquid cover same areas. However, the present invention is not limited thereto. For instance, an ink dot may partly overlaps with the corresponding another ink dot if the intended result is obtained. Similarly, the second ink may be thinned relative to the data of each pixel before it is applied to each ink dot so that the pigments in the third may react with the second ink seeping or flowing out from adjacently located pixels.

Now, the first and second modes of carrying out an ink-jet printing method according to the invention will be described in greater detail by referring to the accompanying drawings.

In the above described first and second modes of carrying out the invention, if the third ink is black ink and characters are printed by means of the black ink, low density cyan ink (to be referred to as pale C hereinafter) is applied onto the printing medium so as to be laid entirely or partly on the pixels to which the black ink is applied. Anionic ink is selected for the Bk ink and the pale C ink is made to contain a substance that destabilizes the dispersion stability of the pigment in the Bk ink so that there occur formation of aggregates and/or precipitates and/or a rise in the ink viscosity when the Bk ink and the pale C ink are mixed with each other on the printing medium.

When pale C ink is used to realize a high OD, the higher the density of the coloring material of the pale C ink, the higher the OD of the black dots formed by the pale C ink and the Bk ink. Therefore, a predetermined OD can be obtained for black dots by raising the density of the pale C ink even if the rate at which the Bk ink is ejected is reduced. However, it should be noted that the positional displacement of the black dots and the corresponding dots of the pale C becomes recognizable when the density of the pale C ink is too high and the OD of the pale C ink exceeds the range between 0.2 and 0.6.

The low OD value between 0.2 and 0.6 for the dots of the pale C ink can be realized by reducing the dye content of the ink as low as 0.5 mass % to 1 mass %. The values of 0.5 mass % and 1 mass % are respectively $\frac{1}{6}$ and $\frac{1}{3}$ of the dye content of ordinary C ink. Thus, as far as the specification of this patent application is concerned, ink showing such an absolutely low dye content is referred to as pale ink Additionally, when two inks containing respective pigments of a same color to different concentrations are used in a manner as described below, the one that shows a relatively low dye content and is laid on the Bk ink is also referred to as pale ink.

Now, an ink-jet printer adapted to use the above described Bk ink and the pale ink containing a salt of a polyvalent metal that is to be applied onto the Bk ink will be described below.

FIGS. 4A through 4D are schematic illustrations of different arrangements of printing heads that can be used for such an ink-jet printer. In the drawings, the printing heads of full-line type are viewed laterally relative to the direction in which paper is fed. It should be noted, however, the combinations of printing heads are not limited to those of full-line type printers and the printing heads may alternatively be combined so as to be adapted to the carriages of serial type printers.

Figure 4A:
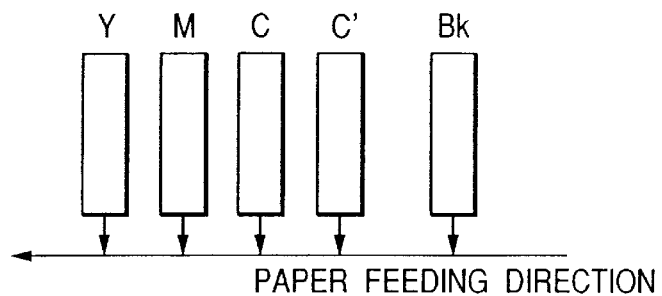
FIGS. 4A, 4B, 4C and 4D are schematic illustrations of different arrangements of printing heads that can be used for an ink-jet printer.

The head arrangement of FIG. 4A is adapted to eject Bk ink, pale C ink, C ink, magenta (to be referred to also as "M" hereinafter) ink and yellow (to be referred to also as "Y" hereinafter) ink in the above mentioned order from the upstream side in terms of paper feeding. With this arrangement, the first ink may be Y ink, M ink or C ink, the second ink is pale C ink and the third ink is Bk ink.

When characters are printed in black with this head arrangement, pale C ink is ejected onto the areas printed by Bk ink ejected from the Bk head so as to be laid on the Bk ink. The dye content of the pale C ink is between 0.3 and 1.5%. Then, even if dots of pale C ink and those of Bk ink are displaced relative to each other, the mutual displacement of the ink dots is not noticeable. Note that the dye content of the pale C ink is between $1/2.5$ and $1/6$ of the dye content of the C ink that is used in this printer.

The pale C ink contains an anionic dye just like the Bk ink and the Y, M and C inks in addition to a salt of a polyvalent metal so that when the pale C ink is laid on the Bk ink, the pigment in the Bk ink is turned undissolvable and/or aggregated to obtain the intended effect of improving the density of the black dots, reducing the phenomenon of feathering and improving the water resistance of the formed image.

Additionally, pale C ink and C ink are applied one on the other in a predetermined reproducible density range in order to reduce the granular feeling and realizing a smooth gradation in low density areas of a printed image. In a range where the input density data on the color of cyan is only small, this is done by using a given density data allocation table and converting the data into density data of pale C ink. On the other hand, in a range where the input density data on the color of cyan is large, it is also done by using a given density data allocation table and allocating the density data to pale C ink and C ink in such a way that more density data is allocated to C ink as the value of the input density data rises. With such an arrangement, the OD of areas of solid pale C ink is preferably ½ of the OD of areas of solid C ink. This relationship is preferably realized by making the dye density of the pale C ink equal to a value between $1/2.5$ and $1/6$ of the dye density of the C ink as well as by realizing the low OD value through thinning.

Figure 4B:
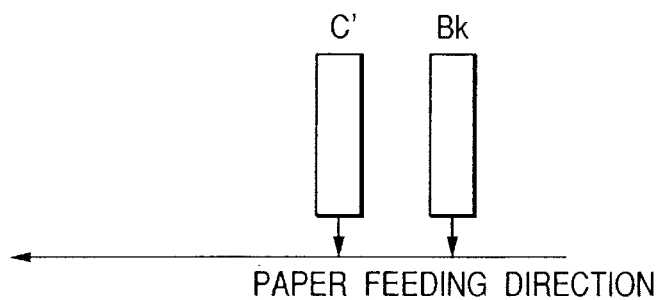

FIG. 4B is a schematic illustration of an arrangement of printing heads for monochromatic printing in black shown for the purpose of reference. As seen from FIG. 4B, a printing head for Bk ink and a head for pale C ink are combined.

Figure 4C:
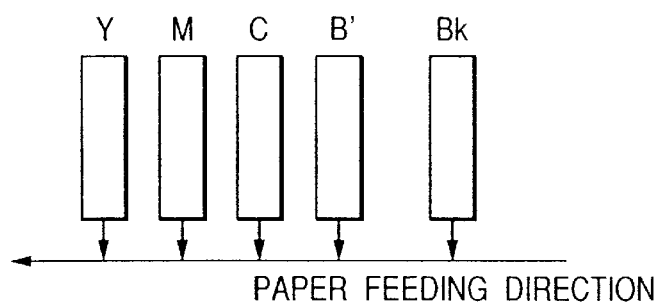

FIG. 4C shows a printing head arrangement where pale C ink in FIG. 4A is replaced by low density blue (to be referred to also as "B" hereinafter) ink, or pale B ink, which is affiliated to C. The net result will be substantially same as the combination of pale C ink and Bk ink. Blue ink normally contains a blue coloring material and/or a cyan coloring material as principle ingredients, although the use of ink containing both a dye to be used for cyan ink and a dye to be used for magenta ink is particularly preferable from the viewpoint of color reproduction and reduction of granular feeling.

Figure 4D:
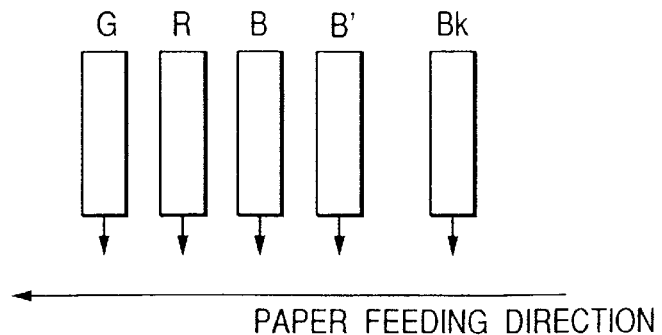

While pale C ink or an affiliate pale B ink is used for the ink to be laid on Bk ink in the above arrangements of FIGS. 4A, 4C and 4D, the present invention is by no means limited thereto. For example, a similar printing effect with making displacement of dots of different colors less noticeable can be realized by using pale M or Y ink in place of pale C ink if the OD value that is to be produced by the density of the coloring material of the ink is selected appropriately. However, from the viewpoint of displacement of dots, dots of C ink or B ink are relatively low in terms of lightness and give a color impression close to that of dots of Bk ink so that the use of pale C or B ink is preferable. Additionally, the use of cyan or blue that is the complementary color of red is highly preferable from the viewpoint that, when the dye contained in Bk ink becomes undissolvable, it turns to be brown or somewhat red so that the color tone of the Bk ink has to be corrected and the reflection density needs to be improved accordingly. Still additionally, from the viewpoint of reducing the granular feeling that is produced when printing an image using some other colors, the granular feeling of C or B ink can be highly remarkable because its lightness is relatively low as pointed out above so that the feeling has to be reduced to improve the quality of the printed image by using pale ink for those colors.

Now, the present invention will be described by way of examples and also by referring to the accompanying drawings. Although the present invention is by no means limited thereto and they may be combined in various different ways and applied to different technological fields facing similar problems.

EXAMPLE 1

Figure 5:
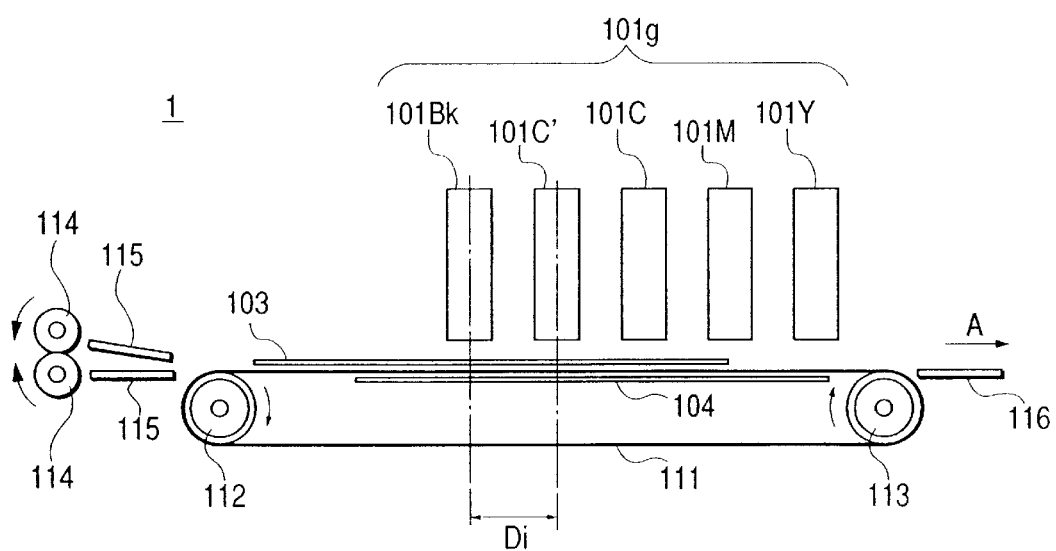
FIG. 5 is a schematic lateral view of a full-line type printing apparatus.
Figure 6:
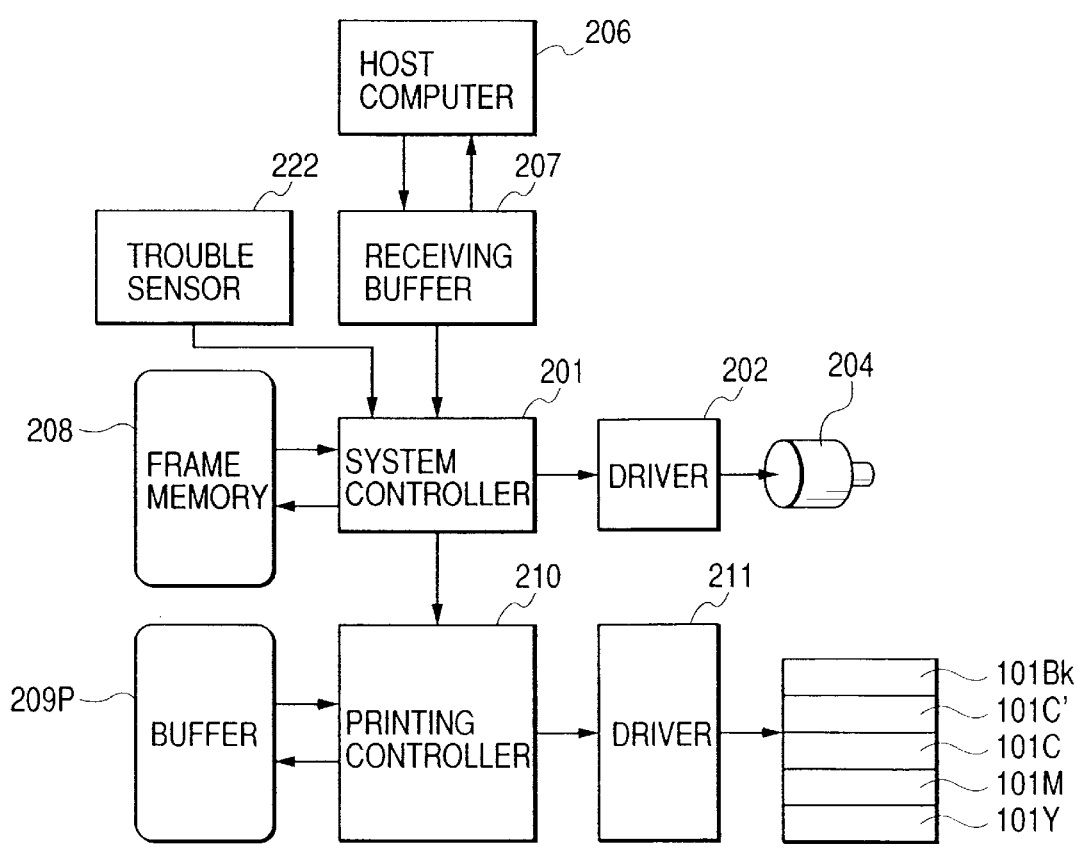
FIG. 6 is a schematic block diagram of the control system of the printing apparatus of FIG. 5.

FIG. 5 is a schematic lateral view of the full-line type printing apparatus used in the example, schematically illustrating the configuration thereof. Referring to FIG. 5, the printing apparatus 1 is realized by employing the ink-jet printing method of causing a plurality of full-line type printing heads arranged at predetermined respective positions along the direction of transfer of the recording medium, or the printing medium, (as indicated by arrow A in FIG. 5) to eject respective inks. The apparatus operates under the control of a control circuit as shown in FIG. 6 and will be described hereinafter.

The group of heads 101g of the apparatus include printing heads 101Bk, 101C', 101C, 101M and 101Y, each of which comprises about 7,200 ink ejection ports arranged in the transversal direction of the sheet of recording paper 103 that is transferred in the direction of A in FIG. 5 (in the direction perpendicular to the drawing), and are adapted to print an image on a sheet of recording paper having the A3 size at largest.

The sheet of recording paper 103 is transferred in the direction of A by means of a pair of register rollers 114 driven by a transfer motor and guided by a pair of guide plates 115 so as to be registered at the front end thereof before it is transferred by transfer belt 111. The transfer belt 111 that is an endless belt is retained by a pair of rollers 112, 113 and the vertical displacement of the upper portion thereof is restricted by platen 104. The sheet of recording paper 103 is transferred as the roller 113 is driven to rotate.

The sheet of recording paper 103 is adsorbed to the transfer belt 111 by static electricity. The roller 113 is driven to rotate in the direction good for transferring the sheet of recording paper 103 in the direction of arrow A by means of a drive source (not shown) such as a motor. As the sheet of recording paper 103 is transferred on the transfer belt 111, an image is recorded by the group of recording heads 101g and then the sheet of recording paper 103 is discharged onto a stock vessel 116.

As pointed out above, the group of recording heads 101g include a head 101Bk for ejecting black ink as described above by referring to the first and second modes of carrying out the invention, a head 101C' for ejecting pale C ink containing a salt of a polyvalent metal and color ink heads including a cyan head 101C, a magenta head 101M and a yellow head 101Y for ejecting respectively C ink, M ink and Y ink that are arranged in the transfer direction A of the sheet of recording paper 103 as shown in FIG. 5. Black characters and/or a color image are printed as the treatment liquid and ink of different colors are ejected from the respective printing heads. Note that pale C ink is ejected onto the ejected Bk ink when printing a black image as described above by referring to the different modes of carrying out the invention.

FIG. 6 is a schematic block diagram of the control system of the printing apparatus 1 of FIG. 5.

Referring to FIG. 6, system controller 201 comprises a microprocessor, a ROM for storing the control program to be used in the apparatus and a RAM for providing work areas for the processing operations of the microprocessor and is adapted to control the entire printing operation of the apparatus. Motor 204 is controlled by way of driver 202 for its driving operation and adapted to driven the roller 113 of FIG. 5 to rotate and transfer the sheet of recording paper.

Host computer 206 transfers all the information necessary to the printing operation of the printing apparatus 1 and controls the printing operation. Receiving buffer 207 temporarily stores the data from the host computer 206 until the data are read by the system controller 201. Frame memory 208 is used to expand the data to be used for the printing operation into image data and has a memory size necessary for the printing operation. While the frame memory 208 has a memory capacity for storing the data of a sheet of recording paper in this example, the present invention is by no means limited by the capacity of the frame memory.

Buffer 209P temporarily stores the data to be used for the printing operation and its memory capacity varies as a function of the number of printing heads and that of ejection ports of the printing heads. Printing control section 210 is adapted to appropriately control the operation of driving the printing heads according to the instructions from the system controller 201 in terms of drive frequency, data to be used for printing and so on and prepare data necessary for discharging pale C ink on the ejected Bk ink on the basis of the data for the ejected Bk ink. The prepared data is then added to the data on the pale C image to be formed. Driver 211 drives the printing heads 101Bk, 101C', 101C, 101M and 101Y for ejecting ink of the respective colors and is controlled by signals from printing control section 210.

With the above described arrangement, printing data are transmitted from the host computer 206 to the receiving buffer 207 and temporarily stored in the latter. Then, the system controller 201 reads out the printing data stored and expanded to the buffer 209P. It is also adapted to detect any abnormal conditions of the apparatus including a condition where a sheet of paper is blocking the transfer route of recording paper and a condition in short supply of ink and/or sheets of paper by means of various detection signals from abnormality sensor 222.

The printing control section 210 prepares data necessary for ejecting pale C ink on the basis of the data on Bk ink out of the data expanded to the buffer 209P. Thus, the buffer 209P stores the OR data of the data on pale C ink for forming black dots and the data on pale C for forming cyan dots when it is used with C ink or independently. Then, the printing control section 210 controls the ejecting operation of each of the printing heads according to the expanded printing data stored in the buffer 209P.

Figure 7:
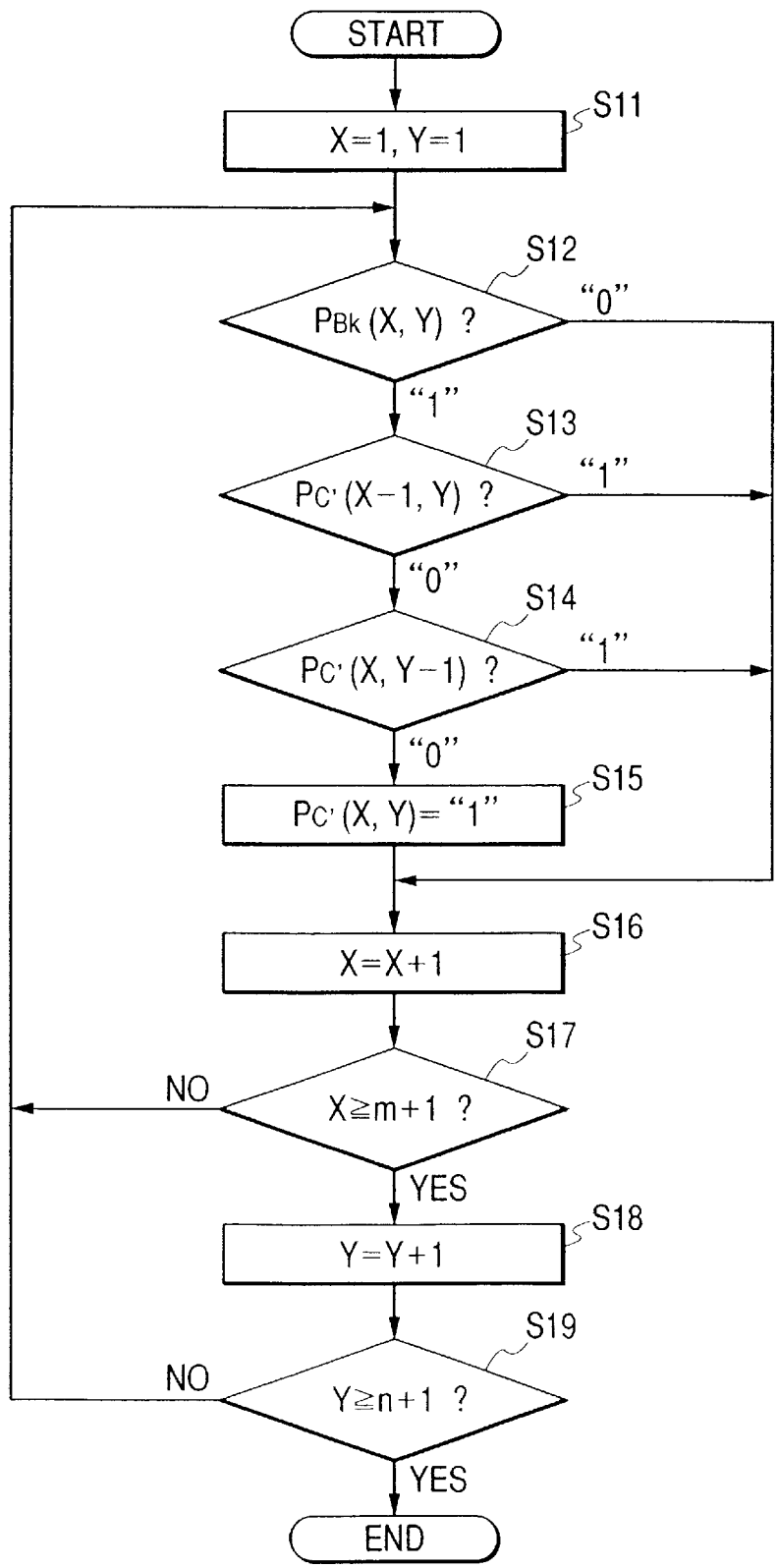
FIG. 7 is a flow chart of the processing operation of generating ejection data of pale cyan (C') ink according to the invention.

FIG. 7 is a flow chart of the processing operation of generating ejection data for pale cyan (C') ink according to the invention. Ejection data for pale cyan ink are generated on the basis of the ejection data for Bk ink stored in the buffer 209P shown in FIG. 6. The buffer 209P stores bit map data of a page obtained for each of the colors of C, pale C, M, Y and Bk by binarizing the image data prepared by means of a predetermined processing operation. In this processing operation, ejection data for pale cyan to be used for ejecting pale cyan ink on the ejected Bk ink are prepared from the ejection data for the Bk ink at a thinning ratio of 50%. The dye concentration of pale cyan ink to be used in this mode of carrying out the invention is 1% and the OD of the pattern printed by using ink of that concentration and thinned at a ratio of 50% is made equal to 0.4. Additionally, in view of that full-line type printing heads are used in this mode of carrying out the invention, data of a single page are prepared in advance from the viewpoint of printing speed.

Referring to FIG. 7, as the processing operation starts, the values of X, Y that are parameters indicating the pixel position are initialized (Step S11). X indicates the pixel position in the direction of arranging the ejection ports of the printing head and Y indicates the pixel position in the direction of transferring the printing medium. Then, in Step S12, it is determined if the ejection data $P_{Bk}(X, Y)$ of Bk ink is equal to "1" (ejection) or "0" (non-ejection) for the pixel position X, Y to be processed. If it is equal to "1" it is determined in Step S13 if the ejection data $P_{C'}(X-1, Y)$ of pale cyan ink for the immediately preceding position in the X direction as determined immediately therebefore is equal to "1" (ejection) or "0" (non-ejection). If it is equal to "0" then it is determined in Step S14 if the ejection data $P_{C'}(X, Y-1)$ of pale C ink for the pixel position on the immediately preceding column relative to the pixel to be processed is equal to "1" (ejection) or "0" (non-ejection). If it is determined to be equal to "0" in Step S15, the ejection data $P_{C'}$ of pale cyan ink for the pixel position to be processed is made equal to "1" so that pale C ink is to be ejected there.

The above processing operation is conducted for the m pixels of a row in the X direction and also for the n rows in the Y direction (Step S16 through S19) in a single page to end the operation. As a result of the above processing operation, it is now possible to carry out a printing operation in pale cyan by ejecting pale cyan ink to the pixels of the image on the page in the form of a so-called checker pattern at a thinning ratio of 50% relative to the black image.

While the image processing operation and the processing operation of binarization as illustrated in FIG. 7 are carried out in the printer in the above description, the present invention is by no means limited thereto. For instance, they may alternatively be carried out by means of the printer driver in the host computer 206.

While pale cyan ink is applied onto any black ink that has already been applied to form a black image in this example, the application of pale cyan ink may be limited to cases where characters requiring a particularly high OD value are printed.

In this example, ink that permeates the printing medium slowly (to be referred to as surface borne type ink in this example) is used for black ink to be ejected from the head 101Bk, whereas ink showing a high permeation rate (to be referred to as high permeability type ink in this example) is used for each of pale cyan ink, cyan ink, magenta ink and yellow ink that are to be ejected from the heads 101C', 101C, 101M and 101Y respectively.

As pointed out earlier, ink containing Acetylenol to a high concentration permeates by a large amount in a unit time to show a high permeability.

The critical micelle concentration (CMC) of a surfactant in a liquid is used as index when causing the liquid to contain the surfactant. As the concentration of the surfactant in the solution rises, there abruptly appears a phenomenon where tens of several molecules rapidly associate when the concentration gets to a certain level. This concentration is referred to as critical micelle concentration. Acetylenol contained in ink to regulate the permeability is a sort of surfactant and hence there exists a critical micelle concentration for Acetylenol that varies depending on the liquid in which it is dissolved.

With regard to the surface tension of a liquid containing Acetylenol to a regulated concentration, the surface tension of the liquid does not fall once micelles are formed. On the basis of this fact, it has been confirmed that the critical micelle concentration (CMC) of Acetylenol relative to water is about 0.7%.

By comparing the critical micelle concentration with Table 1 above, it will be seen that the high permeability ink as defined in Table 1 contains Acetylenol to a concentration level higher than the critical micelle concentration of Acetylenol in water.

The compositions of the pale C ink and the other inks used in this example are listed below. Each of the inks was prepared from a coloring material and a solvent. The contents of the ingredients are expressed in weight portions (to make a total of 100 weight portions).

TABLE 2

(pale cyan (C') ink)

| | |
|---|---|
| Acid Blue 9 | 1 weight portions |
| glycerol | 7 weight portions |
| diethyleneglycol | 5 weight portions |
| Acetylelenol EH | 3 weight portions |
| (available from Kawaken Fine Chemical) | |
| magnesium nitrate | 2 weight portions |
| water | balance |

TABLE 3

(yellow (Y) ink)

| | |
|---|---|
| C. I. Direct Yellow 86 | 3 weight portions |
| glycerol | 5 weight portions |
| diethyleneglycol | 5 weight portions |
| Acetylenol EH | 1 weight portions |
| (available from Kawaken Fine Chemical) | |
| water | balance |

TABLE 4

(magenta (M) ink)

| | |
|---|---|
| C. I. Acid Red 289 | 3 weight portions |
| glycerol | 5 weight portions |
| diethyleneglycol | 5 weight portions |
| Acetylenol EH | 1 weight portions |
| (available from Kawaken Fine Chemical) | |
| water | balance |

TABLE 5

(cyan (C) ink)

| | |
|---|---|
| Acid Blue 9 | 3 weight portions |
| glycerol | 5 weight portions |
| dietheylenglycol | 5 weight portions |
| Acetylenol EH | 1 weight portions |
| (available from Kawaken Fine Chemical) | |
| water | balance |

TABLE 6

(black (Bk) ink)

| | |
|---|---|
| dispersed pigment solution 1 | 25 weight portions |
| dispersed pigment solution 2 | 25 weight portions |
| glycerol | 6 weight portions |
| triethyleneglycol | 5 weight portions |
| Acetylenol EH | 0.1 weight portions |
| (available from Kawaken Fine Chemical) | |
| water | balance |

As may be clear from the composition of the black ink, it contains a pigment containing no dispersant and a pigment containing a polymeric dispersant. The two dispersed pigment solutions were prepared in a manner as described below.

[Dispersed Pigment Solution 1]

1.58 g of anthranilic acid was added at 5° C. to 5.3 g of water containing 5 g of concentrated hydrochloric acid. Then, a solution obtained by adding 1.78 g of sodium nitrite to 8.7 g of water at 5° C. was added to the above solution, while constantly maintaining it to 10° C. or less by keeping it in an ice bath and stirring the solution. After stirring the obtained solution further for 15 minutes, 20 g of carbon black showing a surface area 320 $m^2/g$ and a DBP oil absorption rate of 120 ml/100 g was added thereto. Then, the mixture was stirred for another 15 minutes. The obtained slurry was filtered through Oriental Filter Paper No. 2 (tradename, available from Advantice). The obtained pigment particles were thoroughly washed with water and dried at 110° C. in an oven and then water was added to the pigment to prepare an aqueous solution of the pigment showing a pigment concentration of 10 wt %. With the above process, it was possible to obtain the dispersed pigment solution 1 containing anionically charged self-dispersion type carbon black in a dispersed state, where a hydrophlic group is coupled to the surface by way of a phenyl group as expressed by formula below.

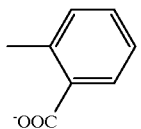

[Dispersed Pigment solution 2]

The dispersed pigment solution 2 was prepared in a manner as described below. 14 portions of styrene-acrylic acid-ethyl acrylate copolymer (acid value: 180, average molecular weight: 12,000) as dispersant, 4 portions of monoethanol amine and 72 portions of water were mixed and heated to 70° C. in a water bath to completely dissolve the resin contents. Since the resin may not be dissolved perfectly when the resin concentration is low, a highly concentrated resin solution may be prepared in advance and diluted to produce a resin solution showing the desired concentration level. 10 portions of carbon black (MCF-88: trandename, pH 8.9, available from Mitsubishi Chemical Corp.) that was adapted to be dispersed in an aqueous medium only by the effect of a dispersant was added to the solution and subjected to premixing for 30 minutes. Subsequently, the solution was subjected to the following process to obtain the dispersed pigment solution 2 where carbon black (MCF-88) was dispersed in the aqueous medium by the dispersant.

| dispersing machine: | Side Grinder (available from Igarashi Kikai) |
|---|---|
| grinding medium: | zirconia beads (diameter: 1 mm) |
| filling factor of grinding medium: | 50% (by volume) |
| grinding time: | 3 hours |
| centrifugal separation treatment: | 12,000 rpm, 20 min. |

As may be clear from the above compositions, the black ink was made to be of the surface borne type, while the C' (pale C) ink and the C, M and Y inks were made to be of the high permeability type by using Acetylenol to different concentration levels.

The concentration of the coloring material of the pale C ink was 1 wt %, which was ⅓ of that of the coloring material of the C ink. Thus, when ejected, the pale C ink shows an OD value of about 0.57. In this example, the ejection data of the pale C ink was obtained from the ejection data for the Bk ink at a thinning ratio of 50% and the OD of the pattern was made equal to about 0.4. As a result, when the ink dots of the Bk ink and the corresponding ink dots of the pale C ink were displaced by about 200 μm in this example by using the above described printing apparatus, the displacement was not particularly noticeable. Additionally, the Bk ink dots showed a high density and a good sharpness.

A displacement of about 100 μm would not give rise to any problem between the Bk ink dots and the corresponding pale C ink dots and the Bk pixels shows a high OD value even if the pale C ink data is obtained without thinning the Bk ink data. Thus, the pale C ink data may be prepared in either way depending on the displacement the dots of the two colors produced by the apparatus.

In this example, the ink ejection ports of each printing head were arranged at a density of 600 dpi and an image was printed with a dot density of 600 dpi in the direction of movement of the recording paper. As a result, the dot density of the image formed on the recording wedium by the printing operation was 600 dpi both in the row direction and the column direction. The ejection frequency of each head was 4 Hz and hence the recording paper was transferred at a rate of about 170 mm/sec. The distance Di (see FIG. 5) separating the ink head 101Bk and the head 101C' for the pale C ink was 40 mm and hence the time from when black ink was discharged to when pale C ink was ejected was about 0.1 sec. Each of the printing head ejects about 18 pl at a time.

A full-line-type printing apparatus having a configuration as described above is operated in such a way that the printing heads were held stationary during the printing operation and hence the time required for transferring the recording paper is equal to the time required for the printing operation. Therefore, such an apparatus is particularly adapted to high speed printing. Thus, by applying the present invention to such a high speed printing apparatus, the high speed printing performance of such an apparatus is further improved to make it possible to print high quality images that show a high OD value and are free from bleeding and haze.

While the printing apparatus used in the above examples was that of a most popular type, it may be replaced by a copying machine or the printing section of a facsimile machine without any problem.

EXAMPLE 2

Figure 8:
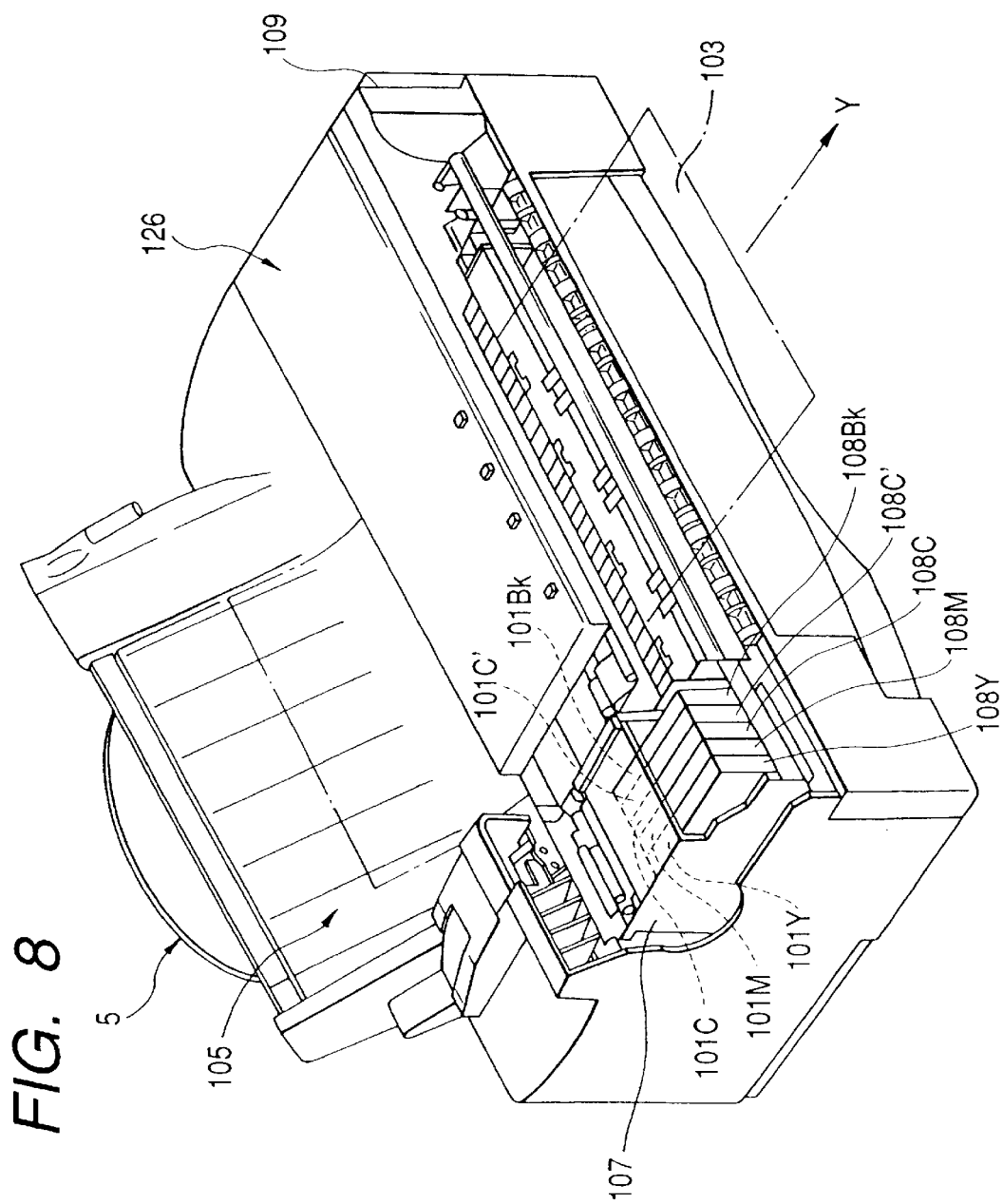
FIG. 8 is a schematic perspective view of a serial type printing apparatus.

FIG. 8 is a schematic perspective view of the serial type printing apparatus 5 used in Example 2, illustrating the configuration thereof. The method of the present invention with which the third ink (containing pigments) is applied to the printing medium first and subsequently the second ink (pale C ink) is applied thereto so as to cause them to react with each other can obviously be used not only with full-line type printing apparatus but also with serial type printing apparatus. The components in FIG. 8 that are similar to those of FIG. 5 are denoted respectively by the same reference symbols and will not be described any further.

Referring to FIG. 8, the printing paper 103, or the printing medium, is inserted from paper feeding section 105 and discharged by way of printing section 126. In this example, low cost popular plain paper was used for the recording paper 103 and the carriage 107 of the printing section 126 was equipped with printing heads 101Bk, 101C', 101C, 101M and 101Y and driven to reciprocate along guide rail 109 by a motor (not shown). The printing head 101Bk was adapted to eject ink containing a coloring material that was a mixture of a dye and a pigment as described above by referring to Example 1. The printing heads 101C', 101C, 101M and 101Y were adapted to eject respectively pale C ink, cyan ink, magenta ink and yellow ink onto the recording paper 103 in the above mentioned order. The concentration of the coloring material of the pale cyan ink was 1%, which was about ⅓ of that of the coloring material of the cyan ink. As a result, the OD of the ejected cyan ink was about 0.57 so that the positional displacement of a Bk ink dot and a pale C ink laid thereon could be made unnoticeable even when the displacement was about 100 μm at maximum.

The heads were fed with respective inks from respective ink tanks 108Bk, 108C', 108C, 108M and 10Y. At the time of ink ejection, a drive signal was fed to each of the electrothermal transducers, or the heaters, arranged at the ejection ports of the respective heads to apply thermal energy to the inks and produce bubbles therein so that the inks were ejected under the pressure of the bubbles. Each of the heads was provided with 64 ejection ports that were arranged to density of 360 dpi substantially in the direction of the transfer of the recording paper 103, or the direction perpendicular to the scanning direction of each of the heads. Ink was ejected by about 23 pl from each discharge port at a time.

With the above described arrangement, any adjacent heads were separated by ½ inches and hence the printing density in the scanning direction was 720 dpi while the ejection frequency of each head was 7.2 KHz so that the pale C ink was ejected from the head 101C' 0.025 sec. after the corresponding ejection of the Bk ink from the head 101Bk.

FIGS. 9A through 9C are schematic illustrations of head arrangements that can be used in a printing apparatus for the purpose of the invention. In each of them, the arrangement of ejection ports is illustrated only schematically.

The arrangement of FIG. 9A has two ejecting sections for ejecting black ink (ejecting sections 101Bk1, 101Bk2) and the ejecting section 101C1 for ejecting pale C ink is arranged therebetween. With this arrangement, black ink is applied first and then pale C ink is applied thereafter. Then, black ink may be applied once again.

The head arrangements of FIGS. 9A, 9B and 9C are realized by integrally forming several ink heads. It may be needless to say that, in such a head unit having a unitary structure, the ejection ports of different inks and the corresponding liquid chambers that communicate with the respective ejection ports are separated from each other. In other words, the ejecting sections of such a unitary structure operate same as those of stand-along arrangement.

Figure 10A:
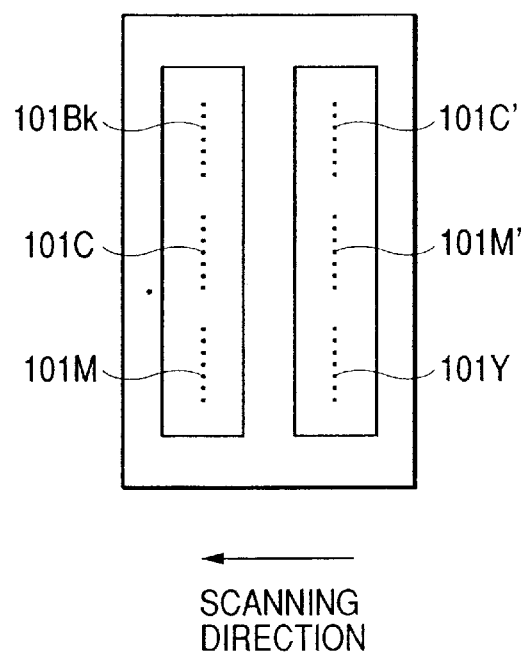
FIGS. 10A and 10B are schematic illustrations of other head arrangements that can be used in a printing apparatus for the purpose of the invention.
Figure 10B:
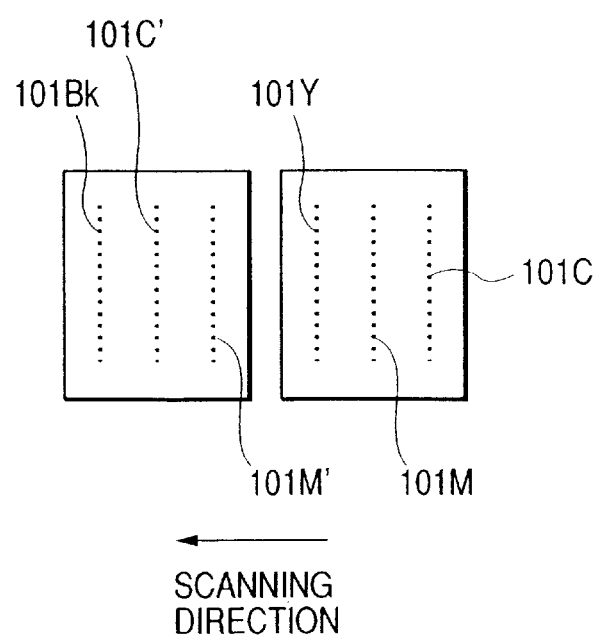

FIGS. 10A and 10B are schematic illustrations of head units that can be used in a serial type printing apparatus for the purpose of the invention.

FIG. 10A shows an arrangement where the ejecting sections of Bk, C and M are arranged vertically and integrally. Similarly, the ejecting sections of pale C, pale M and Y, or 101C', 101M and 101Y, are arranged vertically and integrally.

In the corresponding head unit, the ejecting sections of Bk ink and pale C ink are arranged in parallel so that the two inks may be shot to hit same pixels. With this arrangement, pale C ink can be applied exactly onto the dots of black ink that have already been formed.

Note that the row of the ejecting sections of Bk, C and M and that of the ejecting sections of pale C, pale M and Y are unitized.

If the row of the ejecting sections of Bk, C and M are exclusively for anoinic coloring materials and that of the ejecting sections of pale C, pale M and Y are exclusively for salts of polyvalent metals, inks will not react each other to produce one or more than one insoluble reaction products and block the ejection ports if they are mixed as a result of simultaneous ink drawing operations and/or wiping operations conducted at each row. Then, the overall recovery system can be made to show a simple configuration.

FIG. 10B shows an arrangement where two head units, each comprising three rows of ejecting sections, are arranged in the scanning direction. The head unit that operates first for scanning and ejecting ink comprises the ejecting sections of Bk ink, pale C ink and pale M ink, whereas the otherhead unit comprises the ejecting sections of Y ink, M ink and C ink.

While Bk ink is applied first before the application of pale C ink in the above description, pale C ink may alternatively be applied first before the application of Bk ink so that the latter may be laid on the former. In this example, the pale M ink, the M ink and the Y ink were made to respectively have the following compositions to produce high quality color images.

TABLE 7

(yellow (Y) ink)

| | |
|---|---|
| C. I. Acid Yellow 23 | 3 weight portions |
| glycerol | 7 weight portions |
| diethyleneglycol | 5 weight portions |
| magnesium nitrate | 2 weight portions |
| Acetylenol EH (available from Kawaken Fine Chemical) | 1 weight portions |
| water | balance |

TABLE 8

(magenta (M) ink)

| | |
|---|---|
| magenta dye having structural formula (I) shown above | 3 weight portions |
| glycerol | 7 weight portions |
| diethylene glycol | 5 weight portions |
| Acetylenol EH (available from Kawaken Fine Chemical) | 1 weight portions |
| water | balance |

TABLE 9

(pale magentz (M) ink)

| | |
|---|---|
| magenta dye having structural formula (I) shown above | 1 weight portions |
| glycerol | 7 weight portions |
| diethyleneglycol | 5 weight portions |
| Acetylenol EH (available from Kawaken Fine Chemical) | 1 weight portions |
| magnesium nitrate | 2 weight portions |
| water | balance |

EXAMPLE 3

Now, another example of the invention will be described below. In this example, the content of Acetylenol EH in the pale C ink was made equal to 2 weight portions to make it permeate to a large extent in order to realize a higher fixing speed.

A high fixing speed is indispensable for realizing a high printing speed and improving the throughput. The throughput can be improved directly by raising the drive frequency of the printing heads and the moving speed of the printing medium. However, if the ink on the printing medium being discharged after the completion of the printing operation is not fixed well, the subsequent operations will become cumbersome. Additionally, if the discharged sheets of paper are laid one on the other, the unfixed ink on the sheets can smear each other.

Of the various factors that relate to raising the printing speed, the speed at which sheets of paper where the printing operation is completed are discharged is important and depends on the speed at which the sheets are transferred and/or the speed at which the printing heads are driven to scan them. In the case of an ink-jet printing apparatus comprising so-called full-multi-type printing heads, the speed at which the printing medium is transferred in the printing operation directly refers to the speed at which the printing medium is discharged. In the case of an ink-jet printing apparatus comprising serial type printing heads, on the other hand, the scanning speed of the printing heads is highly significant to the speed at which the printing medium is discharged after the completion of the printing operation. The speed of transferring the printing medium correlates with the resolution of the printed image or the ink ejection cycle relative to the pixels as expressed by using the parameter of dot density. In the case of an arrangement where a single pixel is printed by ink ejected from a plurality of printing heads, the ejection cycle relative to the pixel and the above transfer speed correlate with each other provided that the resolution is invariable.

With regard to this example, a relatively high fixing speed can be realized by using a treatment liquid showing a high permeation rate relative to the printing medium even when the mixed ink is made to show a low permeation rate in order to improve the OD value.

EXAMPLE 4

The process of Example 1 was followed except that the pale cyan ink was replaced by pale blue ink having a composition as shown below and the black (B) ink was made to show the composition listed below.

TABLE 10

(pale blue (B) ink)

| | |
|---|---|
| glycerol | 7 weight portions |
| diethyleneglycol | 5 weight portions |
| Acetylenol EH (available from Kawaken Fine Chemical) | 2 weight portions |
| magnesium nitrate | 2 weight portions |
| Acid Blue 9 | 0.5 weight portions |
| magenta dye having structural formula (I) shown above | 0.5 weight portions |
| water | balance |

TABLE 11

(black (Bk) ink)

| | |
|---|---|
| pigment dispersant solution 1 | 45 weight portions |
| pigment dispersant solution 2 | 5 weight portions |
| glycerol | 6 weight portions |
| diethyleneglycol | 5 weight portions |
| Acetylenol EH (available from Kawaken Fine Chemical) | 0.1 weight portions |
| water | balance |

The Ka value of the black ink was 0.33 ($ml \cdot m^{-2} \cdot msec^{-1/2}$).

EXAMPLE 5

The process of Example 1 was followed except that the pale cyan ink was replaced by pale blue ink having a composition as shown below and the black (B) ink was made to show the composition listed below.

TABLE 12

(pale blue (B) ink)

| | |
|---|---|
| glycerol | 7 weight portions |
| diethyleneglycol | 5 weight portions |
| Acetylenol EH (available from Kawaken Fine Chemical) | 2 weight portions |
| calcium nitrate | 2 weight portions |
| Acid Blue 9 | 0.5 weight portions |
| magenta dye having structural formula (I) shown above | 0.5 weight portions |
| water | balance |

TABLE 13

(black (Bk) ink)

| | |
|---|---|
| pigment dispersant solution 1 | 45 weight portions |
| pigment dispersant solution 2 | 2.5 weight portions |
| Food Black 2 | 0.25 weight portions |
| glycerol | 6 weight portions |
| diethyleneglycol | 5 weight portions |
| Acetylenol EH (available from Kawaken Fine Chemical) | 0.1 weight portions |
| water | balance |

The Ka value of the black ink was 0.33 ($ml \cdot m^{-2} \cdot msec^{-1/2}$).

The full color images obtained in Examples 4 and 5 were remarkable in terms of being free from a granular feeling if compared with the images obtained in Example 1.

While two dyes were used for the pale blue ink, the obtained image will be improved further in terms of granular feeling and smooth gradation of color tone of the full color image when magenta ink containing a magenta dye having the structural formula (I) as coloring material is combined with the pale blue ink and cyan ink containing Acid Blue 9 is also combined with the pale blue ink probably because the so-called dense ink and the pale ink are made to show a common color tone.

A full-multi type printing apparatus having a configuration as described above is operated in such a way that the printing heads were held stationary during the printing operation and hence the time required for transferring the recording paper is equal to the time required for the printing operation. Therefore, such an apparatus is particularly adapted to high speed printing. Thus, by applying the present invention to such a high speed printing apparatus, the high speed printing performance of such an apparatus is further improved to make it possible to print high quality images that show a high OD value and are free from bleeding and haze.

While the printing apparatus used in the above examples was that of a most popular type, it may be replaced by a copying machine or the printing section of a facsimile machine without any problem.

The effects of this example can be obtained when two heads are used for mixed black ink and each of the two heads are adapted to eject about 8 pl of ink at a time to make the total amount of ejected ink to be equal to about 16 pl instead of using a single head for mixed black ink.

Thus, according to the invention, it is now possible to provide an ink set adapted to obtain high quality color prints. Additionally, the present invention provides a color ink-jet printing method and a color ink-jet printing apparatus that realize high speed fixation of printed images without damaging the quality of the images.

What is claimed is:

1. An ink set comprising first, second and third inks respectively containing aqueous media and coloring materials;

said first ink containing an anionic dye as coloring material;

said second ink containing an anionic dye as coloring material and having a lower coloring material content than that of said first ink;

said third ink containing a first pigment, a second pigment and a polymeric dispersant for dispersing said second pigment, both said first pigment and said second pigment being contained in said third ink in a dispersed state;

said first pigment being a self-dispersible pigment and having an anionic group bound to the surface directly or via another atomic group;

said second pigment being dispersible to said aqueous medium by means of said polymeric dispersant;

said polymeric dispersant being at least either an anionic polymeric dispersant or a nonionic polymeric dispersant;

said second ink further containing a substance which destabilizes the dispersion stability of at least either the first pigment or the second pigment in said third ink when the second ink is brought into contact with said third ink in a liquid state on a printing medium.

2. An ink set according to claim 1, wherein said substance which destabilizes the dispersion stability of at least either the first pigment or the second pigment is a polyvalent metal ion or a salt thereof.

3. An ink set according to claim 1, wherein said anionic group is selected from the group consisting of —COOM, —SO$_3$M, —PO$_3$HM and —PO$_3$M$_2$ where M represents a hydrogen atom, an alkali metal, ammonium and an organic ammonium compound.

4. An ink set according to claim 1, wherein said another atomic group is selected from the group consisting of an alkylene group with 1 to 12 carbon atoms, a substituted or unsubstituted phenylene group and a substituted or unsubstituted naphthylene group.

5. An ink set according to claim 1, wherein

80% or more of the particles of said first pigment has a particle diameter of 0.05 to 0.3 μm.

6. An ink set according to claim 5, wherein 80% or more of the particles of said first pigment has a particle diameter of 0.1 to 0.25 μm.

7. An ink set according to claim 1, wherein said second pigment is dispersed by adsorbing the polymeric dispersant to the surface thereof.

8. An ink set according to claim 1, wherein said polymeric dispersant is at least either a polymeric dispersant having sulfonic acid groups or a polymeric dispersant having carboxylic acid groups.

9. An ink set according to claim 1, wherein as the second pigment, at least two pigments whose structures are different from each other are contained.

10. An ink set according to claim 1, wherein said third ink is a black ink.

11. An ink set according to claim 1, wherein the mass ratio of the first pigment to the second pigment in said third ink is between 5/95 and 97/3.

12. An ink set according to claim 11, wherein the mass ratio of the first pigment to the second pigment in said third ink is between 10/90 and 95/5.

13. An ink set according to claim 12, wherein the mass ratio of the first pigment to the second pigment in said third ink is between 4/6 and 9/1.

14. An ink set according to claim 1, wherein said third ink contains a larger amount of said first pigment than said second pigment.

15. An ink set according to claim 1, wherein at least either said first pigment or said second pigment is carbon black.

16. An ink set according to claim 1, wherein said third ink further contains a dye.

17. An ink set according to claim 16, wherein said dye is an anionic dye.

18. An ink set according to claim 17, wherein said anionic dye is selected from the group consisting of acid dyes, direct dyes and reactive dyes.

19. An ink set according to claim 18, wherein said anionic dye has a disazo or trisazo base structure.

20. An ink set according to claim 1, wherein said inks are used for ink-jet recording.

21. An ink-jet recording method comprising steps of:

(1) applying a first ink containing an aqueous medium and an anionic dye as coloring material onto a printing medium by an ink-jet method;

(2) applying a second ink containing an aqueous medium and an anionic dye as coloring material and having a lower coloring material content than the first ink onto the printing medium by means of an ink-jet method; and (3) applying a third ink containing an aqueous medium, a first pigment, a second pigment and a polymeric dispersant for dispersing said second pigment, both said first pigment and said second pigment being contained in a dispersed state, onto the printing medium by an ink-jet method;

said first pigment of self-dispersible pigment and having an anionic group bound to the surface directly or via another atomic group;

said second pigment dispersible to said aqueous medium by means of said polymeric dispersant;

said polymeric dispersant being at least either an anionic polymeric dispersant or a nonionic polymeric dispersant;

said second ink further containing a substance which destabilizes the dispersion stability of at least either the first pigment or the second pigment in said third ink when the second ink is brought into contact with said third ink in a liquid state on the printing medium;

said step (2) being carried out either subsequent to or practically simultaneously with said step (3) so as to make the second ink and the third ink contact each other in a liquid state on the printing medium.

22. An ink-jet recording method comprising steps of:

(1) applying a first ink containing an aqueous medium and an anionic dye as coloring material onto a printing medium by an ink-jet method;

(2) applying a second ink containing an aqueous medium and an anionic dye as coloring material and having a lower coloring material content than the first ink onto the printing medium by means of an ink-jet method; and (3) applying a third ink containing an aqueous medium, a first pigment, a second pigment and a polymeric dispersant for dispersing said second pigment, both said first pigment and said second pigment being contained in a dispersed state, onto the printing medium by an ink-jet method;

said first pigment being a self-dispersible pigment having at least an anionic group bound to the surface directly or via another atomic group;

said second pigment being dispersible to said aqueous medium by means of said polymeric dispersant;

said polymeric dispersant being at least either an anionic polymeric dispersant or a nonionic polymeric dispersant;

said second ink further containing a substance which destabilizes the dispersion stability of at least either the first pigment or the second pigment in said third ink when the second ink is brought into contact with said third ink in a liquid state on the printing medium;

said step (3) being carried out either subsequent to or practically simultaneously with said step (2) so as to make the second ink and the third ink contact each other in a liquid state on the printing medium.

23. An ink-jet recording method according to claim 21 or 22, wherein said substance in the third ink which destabilizes the dispersion stability of at least either the first pigment or the second pigment is a polyvalent metal ion or a salt thereof.

24. An ink-jet recording method according to claim 21 or 22, wherein said third ink is a black ink.

25. An ink-jet recording method according to claim 24, wherein the second ink and the third ink are brought into contact with each other at an area, the area being a boundary zone of a black image formed by the third ink and a color image.

26. An ink-jet recording method according to claim 21 or 22, wherein the permeation rate of at least the first ink or the second ink as expressed by Ka value obtained by means of the Bristow method is not less than 5.0 ml·m$^{-2}$·msec$^{-1/2}$.

27. An ink-jet recording method according to claim 21 or 22, wherein the permeation rate of the third ink as expressed by Ka value obtained by means of the Bristow method is less than 1 ml·m$^{-2}$·msec$^{-1/2}$.

28. An ink-jet recording method according to claim 21 or 22, wherein said anionic group is selected from the group consisting of —COOM, —SO$_3$M, —PO$_3$HM and —PO$_3$M$_2$ where M represents a hydrogen atom, an alkali metal, ammonium or an organic ammonium compound.

29. An ink-jet recording method according to claim 21 or 22, wherein said another atomic group is selected from the group consisting of an alkylene group with 1 to 12 carbon atoms, a substituted or unsubstituted phenylene group and a substituted or unsubstituted naphthylene group.

30. An ink-jet recording method according to claim 21 or 22, wherein

80% or more of the particles of said first pigment has a particle diameter of 0.05 to 0.3 µm.

31. An ink-jet recording method according to claim 30, wherein

80% or more of the particles of said first pigment has a particle diameter of 0.1 to 0.25 µm.

32. An ink-jet recording method according to claim 21 or 22, wherein said second pigment is dispersed by adsorbing the polymeric dispersant to the surface thereof.

33. An ink-jet recording method according to claim 21 or 22, wherein said polymeric dispersant is at least either a polymeric dispersant having sulfonic acid groups or a polymeric dispersant having carboxylic acid groups.

34. An ink-jet recording method according to claim 21 or 22, wherein as the second pigment, at least two pigments where structures are different from each other are contained.

35. An ink-jet recording method according to claim 21 or 22, wherein the mass ratio of the first pigment to the second pigment in said third ink is between 5/95 and 97/3.

36. An ink-jet recording method according to claim 35, wherein the mass ratio of the first pigment to the second pigment in said third ink is between 10/90 and 95/5.

37. An ink-jet recording method according to claim 36, wherein the mass ratio of the first pigment to the second pigment in said third ink is between 4/6 and 9/1.

38. An ink-jet recording method according to claim 21 or 22, wherein said third ink contains a larger amount of said first pigment than said second pigment.

39. An ink-jet recording method according to claim 21 or 22, wherein at least either said first pigment or said second pigment is carbon black.

40. An ink-jet recording method according to claim 21 or 22, wherein said third ink further contains a dye.

41. An ink-jet recording method according to claim 40, wherein said dye is an anionic dye.

42. An ink-jet recording method according to claim 41, wherein said anionic dye is selected from the group consisting of acid dyes, direct dyes and reactive dyes.

43. An ink-jet recording method according to claim 42, wherein said anionic dye has a disazo or trisazo group.

44. A recording unit comprising:

an ink container containing the respective inks of an ink set according to claim 20 and a head section for ejecting the respective inks.

45. An ink cartridge comprising:

an ink container containing the respective inks of an ink set according to claim 1.

46. An ink-jet printing apparatus comprising: an ink container containing the respective inks of an ink set according to claim 20 and a recording head for ejecting the respective inks.

* * * * *

UNITED STATES PATENT AND TRADEMARK OFFICE
CERTIFICATE OF CORRECTION

PATENT NO. : 6,585,815 B2
DATED : July 1, 2003
INVENTOR(S) : Noribumi Koitabashi et al.

It is certified that error appears in the above-identified patent and that said Letters Patent is hereby corrected as shown below:

Column 1,
Line 15, "high" should read -- higher --.
Line 16, "determine" should read -- determines --.

Column 2,
Line 44, "dissolving" should read -- solving --.

Column 3,
Line 26, "above identified" should read -- above-identified --.

Column 4,
Line 16, "haze" should read -- haze. --.
Line 20, "believes" should read -- believe --.

Column 6,
Line 52, "pigmentin" should read -- pigment in --.

Column 7,
Line 7, "reacting" should read -- reacting with --.
Line 52, "above described" should read -- above-described --.

Column 8,
Line 18, "ink of" should read -- ink to --.
Line 33, "having" should read -- has --.

Column 9,
Line 10, "asociation" should read -- association --.
Line 35, "react" should read -- react with --.
Line 40, "react" should read -- react with -- .

Column 11,
Line 56, "above listed" should read -- above-listed --.

Column 12,
Line 39, "above listed" should read -- above-listed --.
Line 66, "above listed" should read -- above-listed --.

UNITED STATES PATENT AND TRADEMARK OFFICE
CERTIFICATE OF CORRECTION

PATENT NO. : 6,585,815 B2
DATED : July 1, 2003
INVENTOR(S) : Noribumi Koitabashi et al.

It is certified that error appears in the above-identified patent and that said Letters Patent is hereby corrected as shown below:

Column 13,
Line 11, "below;" should read -- below: --.
Line 24, "above listed" should read -- above-listed --.

Column 14,
Line 12, "above listed" should read -- above-listed --.
Line 46, "use" should read -- used --.

Column 15,
Line 16, "above listed" should read -- above-listed --.
Line 28, "then" should read -- than --.
Line 52, "hydrophlic" should read -- hydrophilic --.

Column 16,
Line 29, "cobination." should read -- combination. --.
Line 67, "above described" should read -- above-described --.

Column 17,
Line 13, "below;" should read -- below: --.

Column 18,
Line 38, "above" should read -- above- --.

Column 19,
Line 10, "above described" should read -- above-described --.
Line 26, "above described" should read -- above-described --.
Line 56, "above described" should read -- above-described --.

Column 20,
Line 7, "state" should read -- state. --.
Line 8, "above described" should read -- above-described --.
Line 17, "above" should read -- above- --.
Line 28, "overlaps" should read -- overlap --.
Line 37, "above described" should read -- above-described --.
Line 66, "ink" should read -- ink. --.

UNITED STATES PATENT AND TRADEMARK OFFICE
CERTIFICATE OF CORRECTION

PATENT NO.    : 6,585,815 B2
DATED         : July 1, 2003
INVENTOR(S)   : Noribumi Koitabashi et al.

It is certified that error appears in the above-identified patent and that said Letters Patent is hereby corrected as shown below:

Column 21,
Line 5, above described" should read -- above-described --.
Line 13, "the" should read -- that the --.
Line 21, "above mentioned" should read -- above-mentioned --.

Column 23,
Line 32, "driven" should read -- drive --.
Line 59, "above described" should read -- above-described --.

Column 27,
Line 54, "above described" should read -- above-described --.
Line 62, "displacement" should read -- displacement of --.

Column 28,
Line 1, "wedium" should read -- medium --.
Line 52, "above mentioned" should read -- above-mentioned --.

Column 29,
Line 5, "above described" should read -- above-described --.
Line 46, "anoinic" should read -- anionic --.
Line 48, "react" should read -- react with --.

Column 33,
Lines 29 and 32, "has" should read -- have --.

UNITED STATES PATENT AND TRADEMARK OFFICE
CERTIFICATE OF CORRECTION

PATENT NO. : 6,585,815 B2
DATED : July 1, 2003
INVENTOR(S) : Noribumi Koitabashi et al.

It is certified that error appears in the above-identified patent and that said Letters Patent is hereby corrected as shown below:

Column 35,
Lines 47 and 51, "has" should read -- have --.

Signed and Sealed this

Second Day of December, 2003

JAMES E. ROGAN
*Director of the United States Patent and Trademark Office*